US007184631B2

(12) United States Patent
Mitomi et al.

(10) Patent No.: US 7,184,631 B2
(45) Date of Patent: Feb. 27, 2007

(54) OPTICAL DEVICE

(75) Inventors: Osamu Mitomi, Nagoya (JP); Takenori Ichigi, Konan (JP); Masatsugu Oshima, Nagoya (JP); Jun Okumura, Nagoya (JP); Masataka Yamashita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/948,007

(22) Filed: Sep. 6, 2001

(65) Prior Publication Data

US 2002/0159706 A1 Oct. 31, 2002

(30) Foreign Application Priority Data

| | | | |
|---|---|---|---|
| Sep. 18, 2000 | (JP) | ............................ | 2000-281363 |
| Oct. 17, 2000 | (JP) | ............................ | 2000-316071 |
| Mar. 29, 2001 | (JP) | ............................ | 2001-095848 |
| Jun. 26, 2001 | (JP) | ............................ | 2001-192855 |

(51) Int. Cl.
*G02B 6/42* (2006.01)
*G02B 6/00* (2006.01)

(52) U.S. Cl. .......................................... 385/50; 385/39

(58) Field of Classification Search .................. 385/50, 385/39, 44, 45
See application file for complete search history.

(56) References Cited

U.S. PATENT DOCUMENTS

| | | | | |
|---|---|---|---|---|
| 4,449,781 A * | 5/1984 | Lightstone et al. | ........... | 385/43 |
| 4,763,977 A * | 8/1988 | Kawasaki et al. | ....... | 350/96.15 |
| 4,776,655 A | 10/1988 | Robertson et al. | | |
| 4,779,945 A * | 10/1988 | Hill et al. | ................ | 350/96.15 |
| 5,321,782 A * | 6/1994 | Mugino et al. | ............... | 385/41 |
| 5,623,568 A * | 4/1997 | Khan et al. | ................... | 385/45 |
| 5,838,853 A * | 11/1998 | Jinnai et al. | .................. | 385/50 |
| 6,215,918 B1 * | 4/2001 | Keil et al. | ..................... | 385/16 |
| 6,600,843 B2 * | 7/2003 | Sriram et al. | .................. | 385/2 |

FOREIGN PATENT DOCUMENTS

| | | |
|---|---|---|
| JP | 60-86530 | 5/1985 |
| JP | 62-115102 | 5/1987 |
| JP | 63-25631 | 2/1988 |
| JP | 2-3025 | 1/1990 |
| JP | 11-15028 | 1/1999 |
| JP | 2000-180646 | 6/2000 |

OTHER PUBLICATIONS

European Substantive Examination Report for Application No. 01 965 559.6-2205, European Patent Office, Aug. 12, 2004.*
Haruna et al., "Thermal Expansion Coefficient of InP", Jan. 1990, Properties of Indium Phosphide, Institution of Electrical Engineers, pp. 16-17.*

(Continued)

*Primary Examiner*—Sung Pak
(74) *Attorney, Agent, or Firm*—Burr & Brown

(57) ABSTRACT

An optical device includes an optical input waveguide, a branch/cross waveguide, an optical output waveguide and connection waveguides that connect the optical input and optical output waveguides to the cross/branch waveguide. The spot size of light propagating through the cross/branch waveguide is larger than the spot size of light propagating through optical input waveguides, the optical output waveguides, or the connection waveguides.

14 Claims, 19 Drawing Sheets

OTHER PUBLICATIONS

Stone et al., "Index of Refraction Dispersion of n- and p- type InP between 0.95 and 2.0 eV", Dec. 15, 1982, Appl. Phys. Lett., 41(12), pp. 1140-1142.*

Hauffe, Ralf et al., "Crosstalk-Optimized Optical Switching Matrices in Polymers by Use of Redundant Switch Elements", *IEEE Photonics Technology Letters*, vol. 13, No. 3, Mar. 2001, pp. 200-202.

Goh, Takashi et al., "Low Loss and High Extinction Ratio Strictly Nonblocking 16×16 Thermooptic Matrix Switch on 6-in Wafer Using Silica-Based Planar Lightwave Circuit Technology", *J. Lightwave Technology*, vol. 19, No. 3, Mar. 2001, pp. 371-379.

Wang, W. K., et al., "Planar Silica-Glass Optical Waveguides with Thermally Induced Lateral Mode Confinement", *Journal of Lightwave Technology*, (1996), vol. 14, No. 3, pp. 429-436.

U.S. Appl. No. 10/123,872, filed Apr. 16, 2002, Osamu Mitomi et al.

Aretz K et al.; "Reduction of Crosstalk and Losses of Intersecting Waveguide", Electronics Letters, IEE Stevenage, GB, vol. 25, No. 11, May 25, 1989, pp. 730-731.

Khan M N et al.; "Crosstalk-, Loss-, and Length-Reduced Digital Optical Y-Branch Switches Using A Double-Etch Waveguide Structure", IEEE Photonics Technology Letters, vol. 11, No. 10, Oct. 1999, pp. 1250-1252.

H. Kogelnik and V. Ramaswamy: "*Scaling Rules for thin-film optical waveguides*", Applied Optics, vol. 13, No. 8, Aug. 1, 1974 , pp. 1857-1862.

T. Brenner et al., "*Vertically Tapered InGaAsP/InP Waveguide for Highly Efficient Coupling to Flat-End Single-Mode Fibers,*" Applied Physics Letters, vol. 65, No. 15, Aug. 15, 1994, pp. 798-800.

* cited by examiner

OPTICAL DEVICE

TECHNICAL FIELD

The present invention relates to an optical device included in a photonic network utilizing a wavelength division multiplex (WDM) method, for example.

BACKGROUND ART

With the development of the photonic network and optical switching technology, an optical device, for example, an optical switch using an optical waveguide, an optical waveguide device such as an optical modulator and so on is often used.

For example, an optical switch includes a first type using a directional coupler or a Mach-Zender interference waveguide and a second type using a branch/cross waveguide.

The first type of the optical switch operates analogically, for example, as the voltage to be applied for its switching operation increases, the intensity of the output light from the switch gradually reduces to around zero, thereafter as the voltage increases furthermore, the intensity increases again. On the other hand, the second type of the optical switch operates digitally in general, and performs an on-off operation by applying a voltage that is not less than a certain value.

The first type of the optical switch performs an on-off operation by changing the phase of light waves propagating in a waveguide. Therefore, for example, as the first type of the optical switch can perform the switching operation only by slightly changing the refractive index of a waveguide with an electro-optical effect, the first type of the optical switch has an advantage to make the operating voltage of the first type of the optical switch small and have a comparatively high operation efficiency.

However, the first type of the optical switch has a disadvantage in that it has comparatively large size. Also, in order to perform the on-off operation, it is necessary to set the operating voltage of the first type of the optical switch at an appropriate value according to the switching characteristic of the first type of the optical switch. As a result, an electronic circuit for controlling the optical switch has a complex construction, particularly, in case of a device having a plurality of switch elements such as a matrix switch, it is necessary to perform a fine adjustment of the voltage to each switch.

On the other hand, the second type of the optical switch has an advantage in that it has a comparatively small size. As it is enough to apply a voltage that is not less than a certain value in order to perform the switching operation, the second type of the optical switch has an advantage to omit an electric circuit for control and to control easily compared with the first type of the optical switch.

FIG. 1A is a top view of such a first type of the optical device, FIG. 1B is a diagram showing a section I-I of FIG. 1A, and FIG. 1C is a diagram showing a part surrounded by a dashed line in FIG. 1A. This optical device includes a core layer 1 with a cross waveguide, a clad layer 2, an electrode 3 disposed on the cross waveguide and a substrate 4, with the clad layer 2 being deposited on the substrate 4.

This optical device utilizes the total reflection phenomenon of light in the switching operation. That is, when a certain voltage is applied to or a certain current is supplied to the electrode 3, the refractive index of a waveguide just under the electrode 3 is changed by an electro-optical (EO) effect or a thermo-optical (TO) effect of a material composing the waveguide.

Due to such an operation, an input light P0 to the waveguide goes straight in the waveguide to become an output light P1, or is totally reflected by the surface just under the electrode 3 to become an output light P2.

In the case of such a second type of the optical device, however, in order to generate the variation in refractive index necessary to cause the total reflection, it is necessary to make the operating voltage of the second type of the optical switch larger than the first type of the optical device.

In this case, as it is possible to make the amount of variation in refractive index necessary to occur the total reflection small by making the branch angle θ of the cross waveguide, the efficiency of the switching operation can be improved. However, as the smaller the branch angle θ, the larger the size of the optical device, and thus there is a disadvantage to increase the loss and crosstalk remarkably.

As a measure to counter this, as described in Electronics Letters, Vol. 25, No. 11, pp.730–731, 1989, a method of suppressing crosstalk by making the core layer of a branch/cross waveguide wider in width than the core layers of an optical input waveguide and an optical output waveguide is used.

In this case, as the branch/cross waveguide has a comparatively large sectional area, the optical confinement effect in the waveguide is remarkably strong, and thus there is formed a so-called multi-mode waveguide performing the propagation in a plurality of modes.

For the purpose of this, because of a slight variation in shape and material of the waveguide of a product, a basic-mode light input from the optical input waveguide is converted into a high-order mode light resulting from the propagation through this branch/cross waveguide.

The radiation loss or coupling loss to the optical output waveguide caused by such a conversion increases, and thus the optical device may have a remarkably large loss.

Moreover, in case of changing the refractive index of the waveguide with the thermo-optical effect, the amount of variation in refractive index is in proportion to the distribution of the temperature so that the electrode 3 has the highest temperature. Therefore, as the total reflection surface of light formed by changing the refractive index of the waveguide is the same in shape as this distribution of the temperature, and is not perpendicular but inclined to the surface of the clad layer 2, a part of the light reflected by the total reflection surface is emitted from the waveguide, and thus the loss increases. Also, such a part of light may couple to the optical output waveguide opposite to the optical input waveguide, and the crosstalk may degrade.

The object of the present invention is to provide an optical device capable of reducing the optical loss and the crosstalk as well as improving the operating efficiency.

SUMMARY OF THE INVENTION

According to the present invention, there is provided an optical device comprising;

an optical input waveguide, a branch/cross waveguide, an optical output waveguide, and connection waveguides for respectively connecting said optical input waveguide and the branch/cross waveguide and connecting the optical output waveguide and the branch/cross waveguide to each other, wherein the spot size of light propagating through the branch/cross waveguide is larger than the spot size of light propagating through the optical input waveguide, the optical output waveguide, or the connection waveguide.

In the optical input waveguide, the optical output waveguide or the connection waveguide, the coupling loss with the optical element or the optical waveguide to be connected to the optical input waveguide and the radiation loss in the connection waveguide are reduced in accordance with the reduction of the spot size of a light due to the increasing of the optical confinement.

On the other hand, in a branch/cross waveguide, the diffraction of the light, therefore, the loss and the crosstalk are reduced as the spot size of light increases.

According to the present invention, as the spot size of the light propagating through the branch/cross waveguide larger than that of the light propagating through the optical input waveguide, the optical output waveguide or the connection waveguide makes the optical confinement strong and makes the diffraction of the light small, the optical loss and the crosstalk of the optical device are reduced. From a viewpoint of the operating efficiency, it is preferable to make a branch angle small, however, according to the present invention, it is possible to improve the operating efficiency of the optical device because it is possible to have a relatively small branch angle without affecting the optical loss and the crosstalk by having a relatively large spot size of the light propagating through the branch/cross waveguide.

In this specification, the branch/cross waveguide means a branch waveguide or a cross waveguide.

In order to reduce the optical loss and the crosstalk, the spot size of light propagating through the branch/cross waveguide is preferably not less than 5μm, and the spot size of the light propagating through the optical input waveguide, the optical output waveguide or the connection waveguide is preferably less than 5μm.

Another optical device according to the present invention comprises;

an optical input waveguide, a branch/cross waveguide, an optical output waveguide, and connection waveguides for respectively connecting the optical input waveguide and the branch/cross waveguide and connecting the optical output waveguide and the branch/cross waveguide to each other, wherein the spot size of light propagating through said branch/cross waveguide is not less than 5μm.

With the spot size of the light propagating through a branch/cross waveguide not less than 5μm in the present invention, it is possible to make the optical confinement in the optical input waveguide, the branch/cross optical waveguide or the connection waveguide strong and make the diffraction of the light in the branch/cross optical waveguide small, and thus the optical loss and the crosstalk of the optical device are reduced regardless of the spot size of the light propagating through the optical input waveguide, the optical output waveguide or the connection waveguide.

In order to achieve the effect of a remarkable crosstalk reduction, it is preferable to set at least one of the width and the thickness of said branch/cross waveguide at a value smaller than the width or the thickness of the optical input waveguide and the optical output waveguide, and/or to set the ratio of width to the thickness of the branch/cross waveguide not less than 10/4.

Another optical device of the present invention comprises;

an optical input waveguide, a branch/cross waveguide, an optical output waveguide, and connection waveguides for respectively connecting the optical input waveguide and the branch/cross waveguide and connecting the optical output waveguide and the branch/cross waveguide to each other, wherein at least one of the width and thickness of said branch/cross waveguide is set at a value smaller than the width or the thickness of the optical input waveguide and the optical output waveguide.

Another optical device of the present invention comprises;

an optical input waveguide, a branch/cross waveguide, an optical output waveguide, and connection waveguides respectively for connecting the optical input waveguide and the branch/cross waveguide and connecting the optical output waveguide and the branch/cross waveguide to each other, wherein the ratio of the width to the thickness of the branch/cross waveguide is not less than 10/4.

Preferably, the width and the thickness of the branch/cross waveguide are not less than 10 μm and not more than 4μm, respectively, and more preferably, the cross/branch angle of the branch/cross waveguide is 3 to 6 degrees. The branch/cross waveguide consists of a single-mode waveguide, for example.

Preferably, the branch/cross waveguide has a tapered waveguide. Thereby, as it is possible to gradually change the spot size between waveguides different in spot size from each other, the optical loss can be reduced.

Preferably, it is possible to reduce the coupling loss between the optical input waveguide and the optical device such as a plane light circuit (PLC) and a semiconductor optical device or the optical waveguide such as an optical fiber by the spot size of the light input into the optical input waveguide substantially equal to the spot size of the light output from an optical element or an optical waveguide to be connected to the optical input waveguide.

If the spot size of the light output from the optical output waveguide is substantially equal to the spot size of the light input into the optical element or the optical waveguide to be connected to the optical output waveguide, it is possible to reduce the coupling loss between the optical output waveguide and the optical device or the optical waveguide.

The device of the present invention may further comprise an optical switch for switching over the direction of propagation of light input into the branch/cross waveguide, in this case, the optical switch has at least one electrode for changing the refractive index of the branch/cross waveguide by applying a certain voltage or supplying a certain current, for example.

Another optical device according to the present invention comprises;

a core layer having a branch/cross waveguide, a first clad layer having a specific refractive index, with the core layer being deposited on a part of a surface of the first clad layer, a second clad layer having a refractive index different from that of the first clad layer, with the core layer being provided between the first clad layer and the second clad layer, and at least one electrode for changing the refractive index of the branch/cross waveguide by applying a certain voltage or supplying a certain current.

According to the present invention, as the second clad layer having a refractive index different from that of the first clad layer, the total reflection surface may be substantially perpendicular to the surface of the second clad layer. As a result, the loss reduces because the light reflected by the total reflection surface does not substantially emit from a waveguide. Also, the degradation of the crosstalk result from the coupling of a part of the light into the optical output waveguide opposite to the optical input waveguide.

From a viewpoint of reduction of the coupling loss, the thickness of the first clad layer is preferably between 4μm and 40μm, and more preferably between 4μm and 15μm.

A core layer with a single-mode optical waveguide does not have a remarkably strong optical confinement effect because of a comparativly small sectional area of the core layer, and is generally called a flat core layer.

The core layer may have a single-mode optical input waveguide, a single-mode branch/cross waveguide and a single-mode optical output waveguide, the electrode may be a rectangular electrode disposed near the single-mode branch/cross waveguide, the ratio of the width of the electrode to that of said waveguide may be not less than 0.2 and/or not more than 3, so that the optical device has a function of switching the light so as to pass through the first clad layer from the single-mode branch/cross waveguide and propagate again through the single-mode branch/cross waveguide.

In this case, even if the ratio of the width of the electrode to that of the optical waveguide is relatively large, it is possible to have a substantially small excess loss and to have a relatively large extinction ratio of the switching because the optical confinement is not remarkably strong. The ratio of the width of the electrode to that of the optical waveguide is established by the relation between the temperature of the electrode and the driving power.

For example, each of the first clad layer and the second clad layer consists of a material having a negative temperature coefficient, and the refractive index of the first clad layer is lower than that of the second clad layer.

Alternatively, each of the first clad layer and the second clad layer consists of a material having a positive temperature coefficient, and the refractive index of the first clad layer is higher than that of the second clad layer.

DETAILED DESCRIPTION OF THE INVENTION

Embodiments of the optical device according to the present invention are described in detail with reference to the drawings. In the embodiments described below, the optical device using a flat core as the core layer is described, but the optical device of the present invention is not limited to those devices employing only flat cores as the core layer.

Figure 2A:
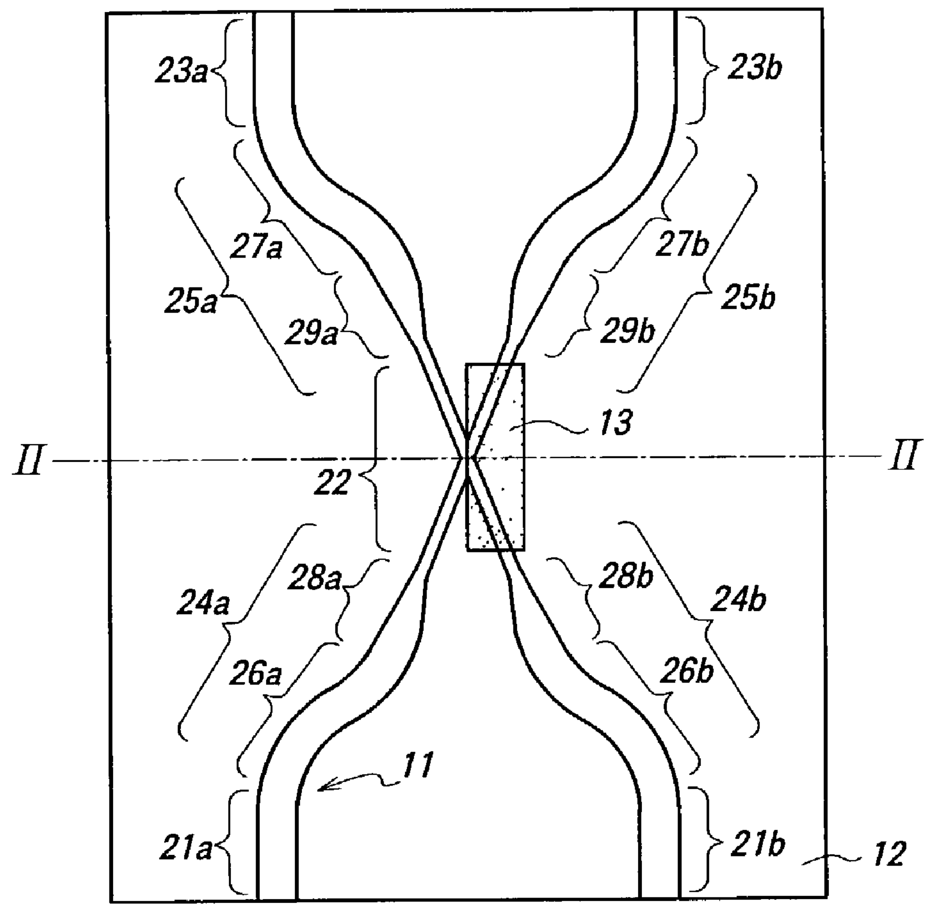
FIGS. 2A and 2B are diagrams showing a first embodiment of the optical device according to the present invention.
Figure 2B:
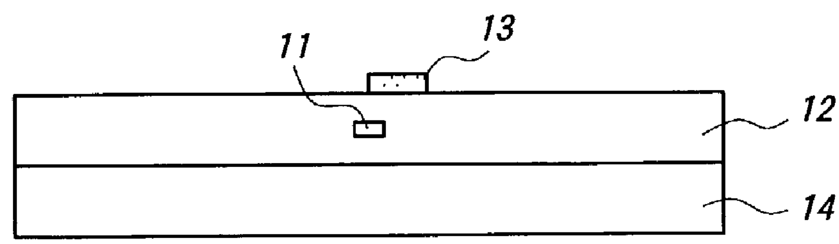

FIG. 2A is a top view of a first embodiment of the optical device according to the present invention, and FIG. 2B shows a section II—II of FIG. 2A.

This optical device formed as a 1×2 optical switch includes a core layer 11, a clad layer 12, an electrode 13 disposed on a cross waveguide and a substrate 14, with the clad layer 12 being deposited on the substrate 14.

The core layer 11 has optical input waveguides 21*a* and 21*b*, a cross waveguide 22, optical output waveguides 23*a* and 23*b*, connection waveguides 24*a* and 24*b* respectively for connecting the optical input waveguide 21*a* and the cross waveguide 22 and connecting the optical input waveguide 21*b* and the cross waveguide 22, and connection waveguides 25*a* and 25*b* respectively for connecting the optical output waveguide 23*a* and the cross waveguide 22 and connecting the optical output waveguide 23*b* and the cross waveguide 22. The connection waveguides 24*a*, 24*b*, 25*a* and 25*b* have curved waveguides 26*a*, 26*b*, 27*a* and 27*b*, and tapered waveguides 28*a*, 28*b* 29*a* and 29*b*, respectively. Each of these optical input waveguides 21*a* and 21*b*, cross waveguide 22, optical output waveguides 23*a* and 23*b*, and connection waveguides 24*a*, 24*b*, 25*a* and 25*b* is a single-mode optical waveguide.

In this embodiment, the width of the cross waveguide 22 is smaller than those of the optical input waveguides 21*a* and 21*b*, the optical output waveguides 23*a* and 23*b*, and the curved waveguides 26*a*, 26*b*, 27*a* and 27*b*. Also, the spot size of the light propagating through the cross waveguide 22 is larger than that of the light propagating through the optical input waveguides 21*a* and 21*b*, the optical output waveguides 23*a* and 23*b*, or the connection waveguides 24*a*, 24*b*, 25*a* and 25*b*.

Figure 3:
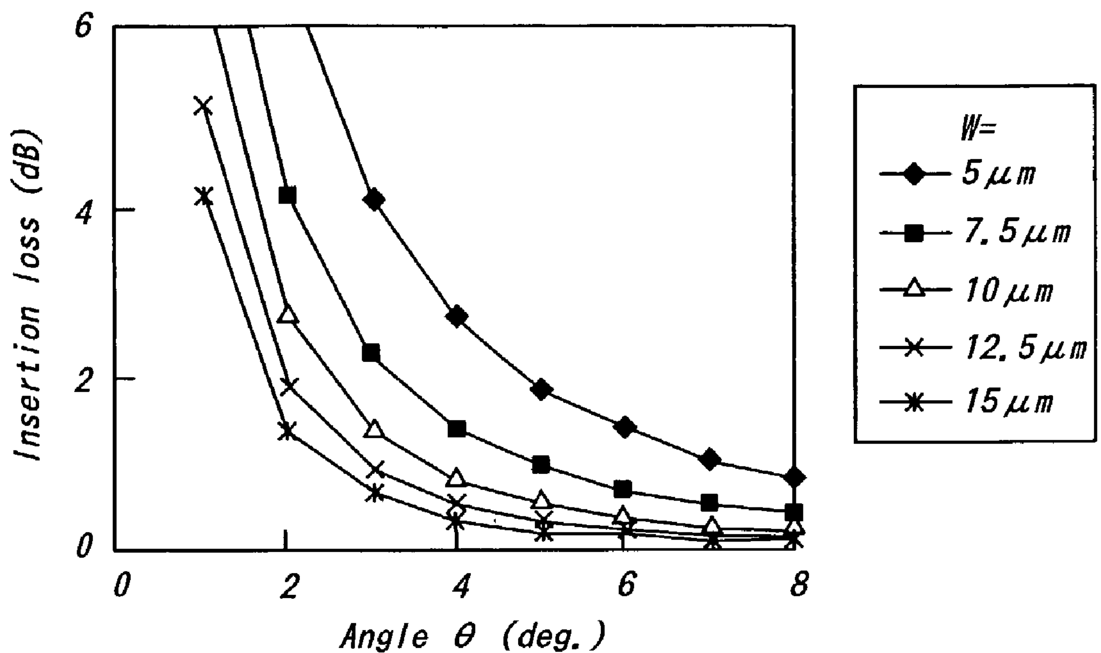
FIG. 3 is a diagram showing the relation between the branch angle θ and loss of the cross waveguide.
Figure 4:
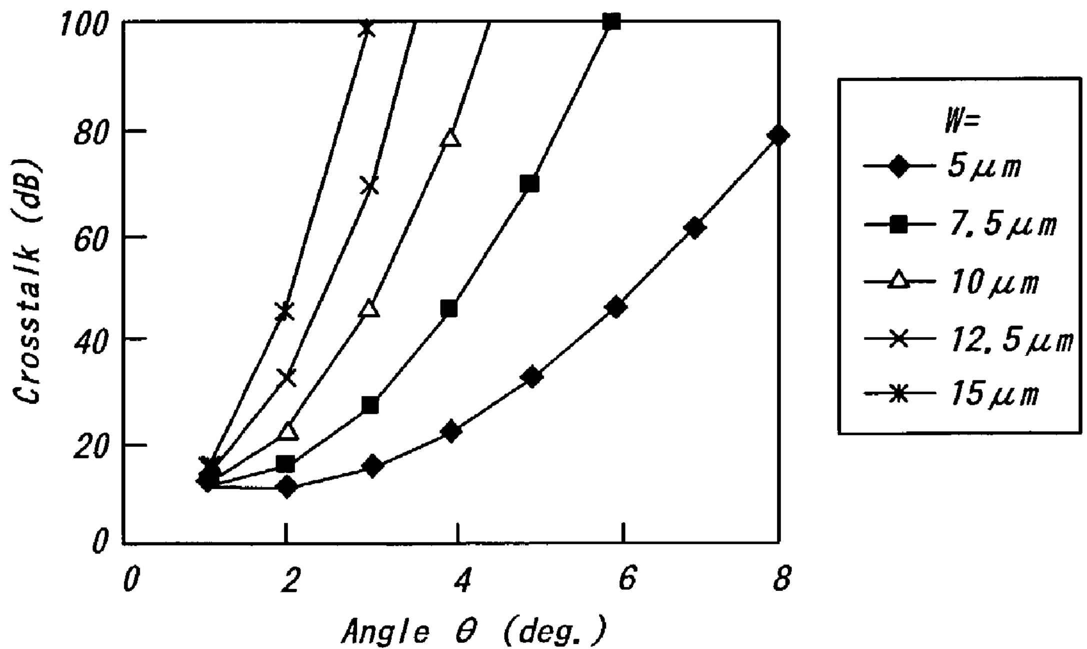
FIG. 4 is a diagram showing the relation between the branch angle θ and crosstalk of the cross waveguide.

FIG. 3 is a diagram showing the relation between the branch angle θ of the cross waveguide and the loss, and FIG. 4 is a diagram showing the relation between the branch angle θ of the cross waveguide and the crosstalk. In FIGS. 3 and 4, the relations when each of the spot size of the light propagating through the cross waveguide is set at 5 μm, 7.5 μm, 10 μm, 12.5 μm, and 15 μm are plotted, and the propagating light is assumed to be circular.

And in order to simplify the calculation, the analysis is performed under the assumption that the distribution of the intensity of the light waves propagating through the cross waveguide is a Gaussian distribution. The light waves in the optical input waveguide and the optical output guide each having a normal optional confinement effect are in the shape of the Gaussian distribution.

In the switching state where the light is input into the optical input waveguide 21*a* and is output from the optical output waveguide 23*b*, if the optical power of the input light is represented as P10, that of the light output from the optical output waveguide 23*b* is represented as P11, and that of the light output from the optical output waveguide 23*a* is represented as P12, the loss is represented by P11/P10 and the crosstalk is represented by P12/P10.

Because the light input into the cross waveguide 22 travels and spreads due to the influence of the diffraction, the loss and the crosstalk of the light occur at the output side of the cross waveguide 22 in principle. Therefore, the smaller the branch angle θ is, the larger the size of the cross waveguide 22 at the longitudinal direction in FIG. 2A is, as a result, the optical loss and the crosstalk increase.

In case of the single-mode optical waveguide, as the spot size of the light decreases by the strong optical confinement, the radiation loss of the light at the curved waveguide decreases. In case of a conventional optical switch, it is possible to reduce the coupling loss with an optical fiber to be connected to the switch and the radiation loss at the curved waveguide.

In the conventional optical switch, in order to reduce the coupling loss and the radiation, the size and the material of the waveguide are selected so that the spot size of the light propagating through the waveguide of the optical switch is about 5 μm so as to be substantially equal to that of the light propagating through the single-mode optical fiber or is less than 5 μm by making the optical confinement stronger.

As seen from FIGS. 3 and 4, in order to reduce the loss to 1 dB or less and obtain the crosstalk to 50 dB or more, not less than 8° of the branch angle θ is required. If the branch angle θ is constant, as the spot size increases, the reduction of the loss and the improvement of the crosstalk increase. Further, if the loss and the crosstalk are constant, respectively, as the spot size increases, the branch angle θ increases because as the spot size increases, the diffraction of the light at the cross waveguide reduces.

According to the present embodiment, it is possible to reduce the loss and the crosstalk without the increase of the optical device size by having the spot size of the light propagating through the cross waveguide 22 larger than that of light propagating through the optical input waveguides 21*a* and 21*b*, the optical output waveguides 23*a* and 23*b*, or the connection waveguides 24*a*, 24*b*, 25*a* and 25*b*, as a result, the operating efficiency of the optical device can be improved.

Figure 5:
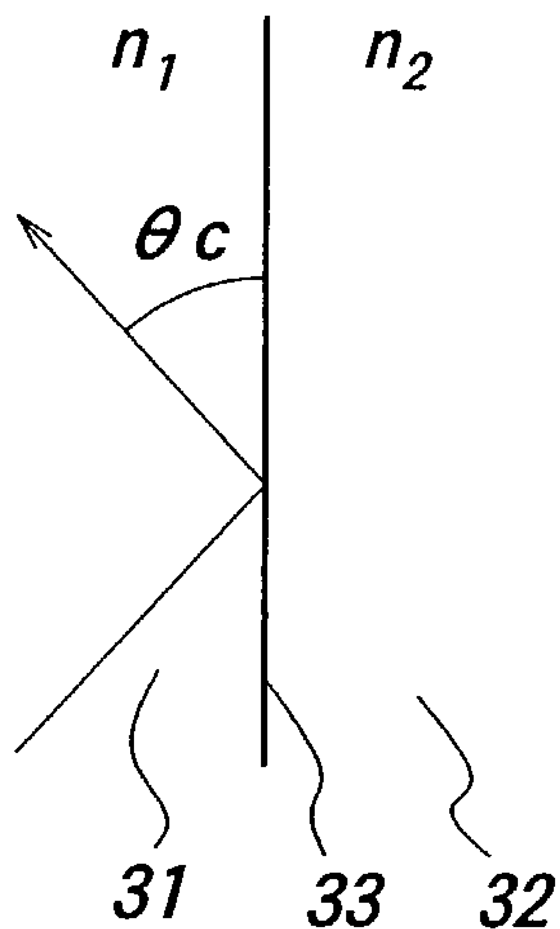
FIG. 5 is a diagram showing the principle of the present invention.

FIG. 5 is a diagram for explaining the principle of the present invention. This shows the reflection condition for the total reflection of the light in the interface 33 between a medium 31 with the refractive index n1 and a medium 32 with the refractive index n2 (n1≧n2). If the angle of reflection is represented as θc, the following relation is fulfilled.

$$\cos\theta c = n2/n1 \quad (1)$$

If the value of that refractive index n 1 is substantially equal to that of the refractive index n2, the light passes through the interface 33. On the other hand, if the value of refractive index n1 or n2 is changed, the light is totally reflected by the interface 33 and a switching operation is performed. Here, the amount of refractive index change θnc required for the total reflection at the cross waveguide is represented by the following expression:

$$\theta nc = (n1 - n2)/n2 \quad (2)$$

In this case, the relation between the amount of refractive index change θnc required for the switching operation and the angle of the reflection θc in which the total reflection is performed is represented as shown in Table 1. In Table 1, ΔT is a rough estimate of the amount of temperature change required for the amount of refractive index change θnc in case of using polymer as the material of the waveguide and considering a TO effect of the polymer ($-1\times10^{-4}$/° C.≦θnc≦$-2\times10^{-4}$/° C.).

TABLE 1

| Δnc (%) | 0.1 | 0.2 | 0.3 | 0.4 | 0.5 |
|---|---|---|---|---|---|
| ΔT (°) | 10 | 20 | 30 | 40 | 50 |
| θc (°) | 2.6 | 3.6 | 4.4 | 5.1 | 5.7 |

Therefore, the larger the branch angle θ is, the larger the amount of refractive index change Anc required for the total reflection, namely, the switching operation is, and thus the operation temperature increases. Therefore, from a viewpoint of the operating efficiency, it is preferable to have the branch angle θ as small as possible.

As known from FIGS. 3 and 4, if the loss and the crosstalk are constant, respectively, as it is possible to make the branch angle θ comparatively small by making the spot size of the light at the cross waveguide comparatively large, the efficiency of the switching operation can be improved drastically compared with the prior art.

Figure 6A:
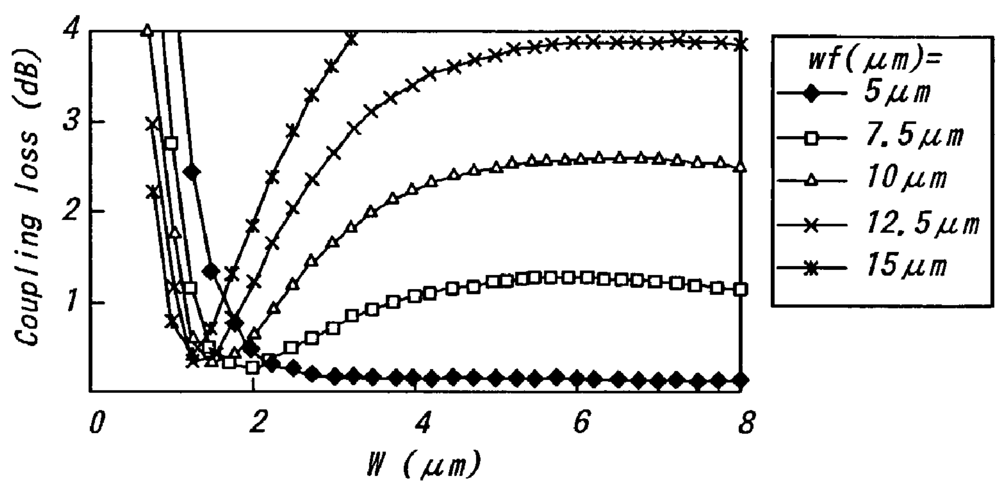
FIGS. 6A and 6B are diagrams showing the relation between the size of the waveguide and the coupling loss with the optical fiber.
Figure 6B:
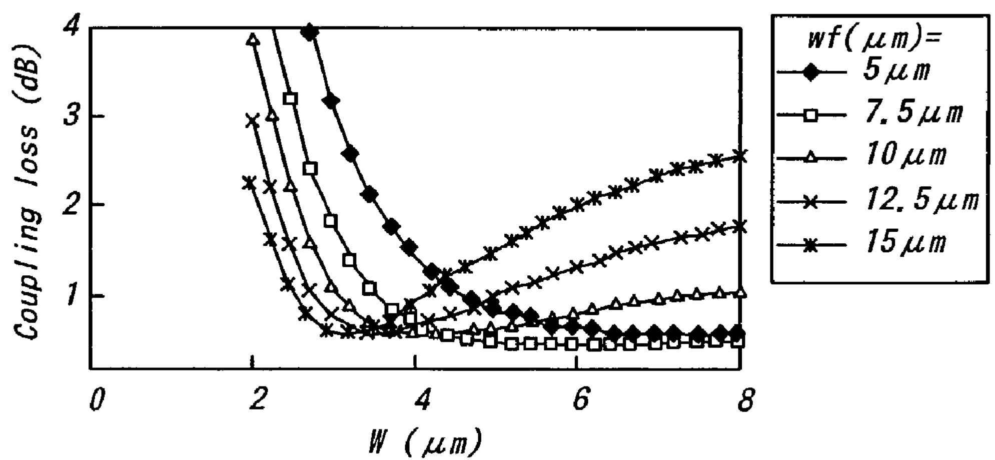

FIG. 6A is a diagram showing the relation between the waveguide size and the coupling loss with the optical fiber when the thickness of the core layer with the waveguide is 6 μm, and FIG. 6B is a diagram showing the relation between the waveguide size and the coupling loss with the optical fiber when the thickness of the core layer with the waveguide is 2 μm.

These are obtained by calculating the relation between the thickness T and the width W of the core layer and the coupling loss with the optical fiber by means of a steady state interface analysis using a finite element method.

In this case, it is assumed that a material whose refractive index n is about 1.5 such as quartz, glass or polymer is used as the material of the waveguide, where the refractive index difference Δn between the core layer and the clad layer is 0.5% and the wavelength of the light propagating through the waveguide is 1.55 μm. If the refractive index of the core layer is nc and the refractive index of the clad layer is ns, the refractive index difference Δn has the following relation:

$$\Delta n=(nc-ns)/ns$$

Symbol wf in FIGS. 6A and 6B represents the spot size of the light propagating through the optical fiber. In case of the conventional optical fiber, wf=5 μm.

In case of the single-mode waveguide, provided that the thickness T is constant, the optical confinement is weakened and thus the spot size decrease as the width reduces. Therefore, if the coupling loss is small, the spot size wf is substantially realized by the waveguide size of itself.

The light propagating through the waveguide with the width W and the thickness T different from each other generally has a shape similar to an ellipse. Assuming that the spot size in the lateral direction is wx and that in the vertical direction is wy, an effective spot size is represented by $(wx \times wy)^{1/2}$.

As seen from FIG. 6, if the refractive index difference Δn is 0.5% and the thickness T is constant, the spot size wf can be set at a proper size by changing the width W. For example, in order to set the spot size wf at 5 μm, the width W is 7 μm when the thickness T is 6 μm, and the width W is 8–10 μm when the thickness T is 2 μm. In order to set the spot size wf at 10 μm, the width W is 2 μm when the thickness T is 6 μm, and the width W is 4–4.5 μm when the thickness T is 2 μm. Therefore, the spot size wf can be set at a desired size by selecting the material of the waveguide, the refractive index difference Δn, the thickness T or the width W properly.

Similar to the embodiment of the present invention shown in FIG. 2, between waveguides different in spot size from each other, the tapered waveguides 28*a*, 28*b*, 29*a* and 29*b* gradually varying in width or thickness are formed and the taper lengths are set at a degree of several 10 μm to several 100 μm for example, and thereby the coupling loss between the waveguides can be reduced.

Also, it is possible to determine the spot size as desired by having the cross waveguide with the same size as that of the waveguides in the other area and having the refractive index differences in the respective areas different from one another. In this case, the refractive index differences among the tapered waveguides 28*a*, 28*b*, 29*a* and 29*b* vary gradually.

As a method of increasing the spot size, a method of keeping the thickness of the core layer constant and making the width of the core layer narrow has been described, however, it is possible to apply a method of making the thickness of a core layer substantially thin and thus making the width of the core layer wide, or a method of constructing a waveguide structure comprising a plurality of waveguide layers, and it is possible to obtain effects of the present invention by adopting any spot size converting waveguide structure conventionally used. These waveguides can be formed by using a conventional photolithographic technique, a film forming technique, an epitaxial selective growth technique and so on.

According to the present embodiment, it is possible to reduce the optical loss and the crosstalk in the optical device and improve the operating efficiency of the optical device by making the spot size of the light propagating through the cross waveguide larger than that of the light propagating through the optical input waveguide, the optical output waveguide or the connection waveguide.

By having the substantially same spot size of the light input into the optical input waveguide as that of light output from the optical element or the optical waveguide to be connected to the optical input waveguide, it is possible to reduce the coupling loss between the optical input waveguide and such an optical element as a plane light circuit (PLC) or a semiconductor optical device or such an optical waveguide as an optical fiber.

Further, it is possible to keep the whole loss of the optical device small because any other waveguide than the cross waveguide is formed so that the radiation loss is small by making the optical confinement strong and thus making the spot size of the light small.

Figure 7:
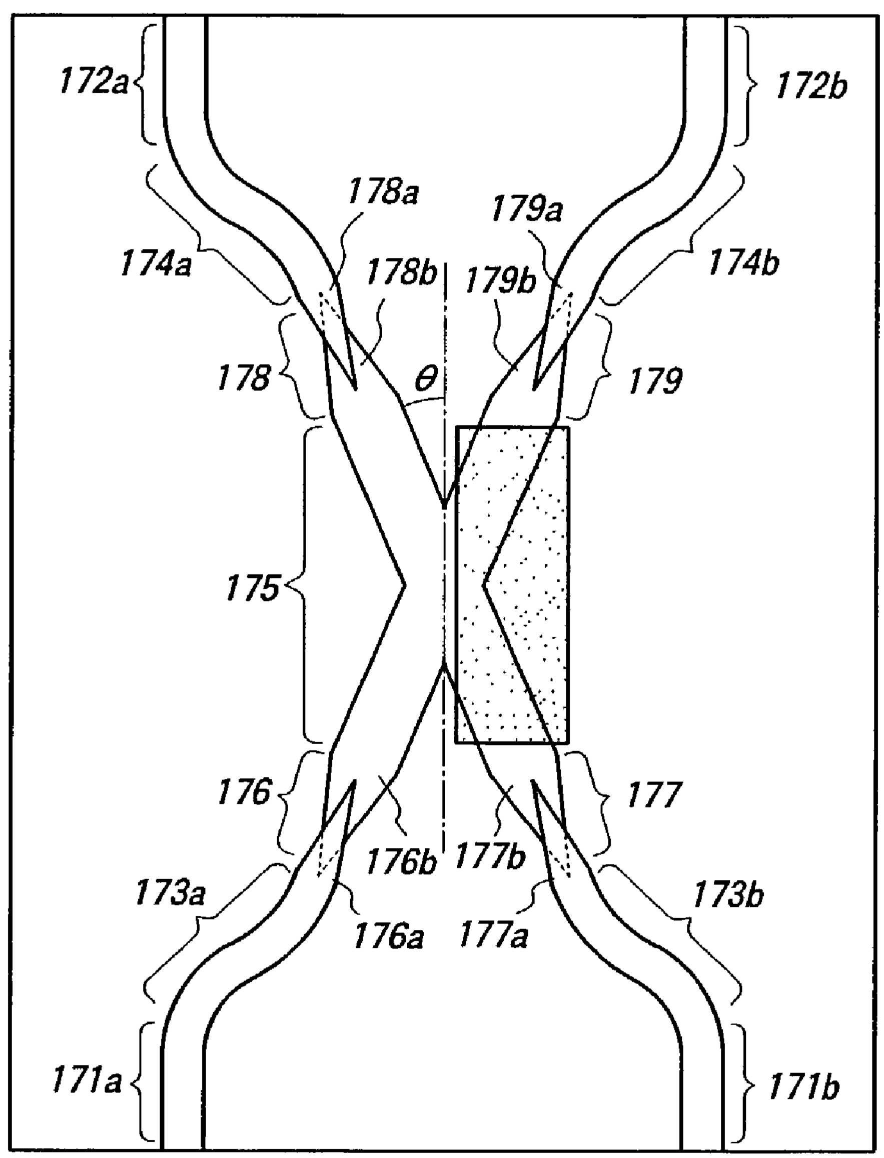
FIG. 7 is a diagram showing a second embodiment of the optical device according to the present invention.

FIG. 7 is a diagram showing a second embodiment of the optical device according to the present invention. This optical device comprises optical input waveguides 171*a* and 171*b* and optical output waveguides 172*a* and 172*b* each having the width W1 and the thickness T1, curved waveguides 173*a*, 173*b*, 174*a* and 174*b* each having the width W2 and the thickness T2, and a cross waveguide 175 having the width W3 and the thickness T3 as a core layer. In this case, it has relations of "W3≧W1" and "T1≧T3".

Tapered waveguides 176, 177, 178 and 179 interposed between the curved waveguides 173*a*, 173*b*, 174*a* and 174*b* and the cross waveguide 175 have tapered portions 176*a*, 177*a*, 178*a* and 179*a* extending from the curved waveguides 173*a*, 173*b*, 174*a* and 174*b*, and tapered portions 176*b*, 177*b*, 178*b* and 179*b* extending from the cross waveguide 175.

The spot size of the light is converted with a low loss by each of these tapered portions 176*a*, 177*a*, 178*a* and 179*a* and tapered portions 176*b*, 177*b*, 178*b* and 179*b*. In case of having relations of "W3≧W1" and "T1≧T3", it is also possible to compose these waveguides of the single core layer by forming the lateral width and the layer thickness of them into a tapered shape.

In this embodiment, also, it is possible to reduce the optical loss and the crosstalk in the optical device and improve the operational efficiency of the device by making the spot size of the light propagating through the cross waveguide larger than that of the light propagating through the optical input waveguide, the optical output waveguide or the connection waveguide.

Figure 8:
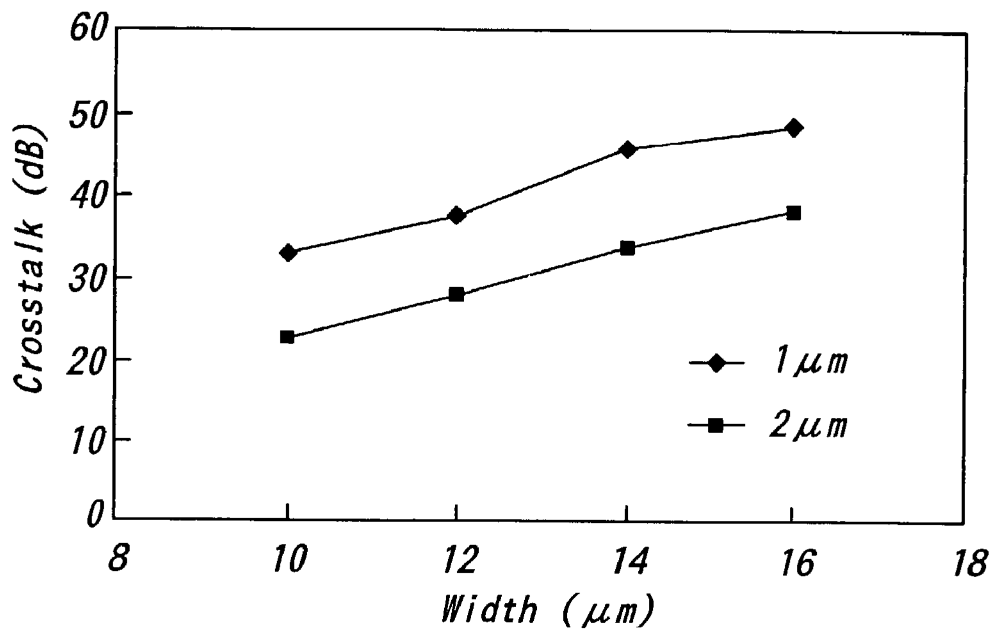
FIG. 8 is a diagram showing the relation between the width of a core layer with the thickness of 1 μm or 2μm and the crosstalk of the second embodiment.
Figure 9:
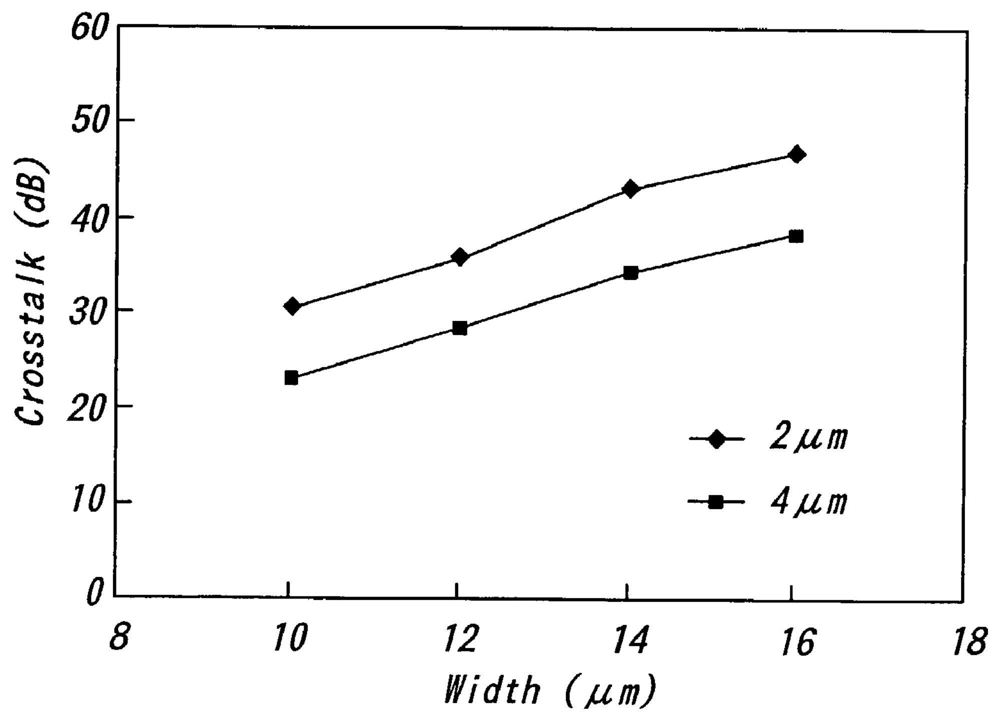
FIG. 9 is a diagram showing the relation between the width of a core layer with the thickness of 2μm or 4μm and the crosstalk of the second embodiment.

FIG. 8 is a diagram showing the relation between the width of a core layer with the thickness of 1 μm or 2 μm and the crosstalk of the second embodiment, and FIG. 9 is a diagram showing the relation between the width of a core layer with the thickness of 2 μm or 4 μm and the crosstalk of the second embodiment. In FIG. 8, the branch angle θ is 4° and the refractive index difference between the core layer and the clad layer is 0.5%, and in FIG. 9, the branch angle θ is 4° and the refractive index difference between the core layer and the clad layer is 0.3%.

As seen from FIGS. 8 and 9, the lager the width of the core layer is, the greater the crosstalk characteristic is, and a good crosstalk characteristic cannot be obtained if the width of a core layer is not more than 10 μm like a conventional optical device. The larger the width of a core layer is, the greater the crosstalk characteristic is, however, if the width of the core layer is larger than a certain value, the waveguide comes into a multi-mode state and the loss increases.

As seen from FIGS. 8 and 9, the thinner the width of a core layer is, the greater the crosstalk characteristic is if the width of the core layer is constant. In this embodiment, the branch/cross waveguide is of a single-mode waveguide structure.

Further, in the second embodiment, it is possible to realize a crosstalk reduction effect being remarkably excellent in comparison with a conventional waveguide structure by making a structure having the optical confinement effect in the waveguide with the core layer much thinner than the ordinary waveguide structure. A principle for obtaining such an effect is described in the following.

Figure 10:
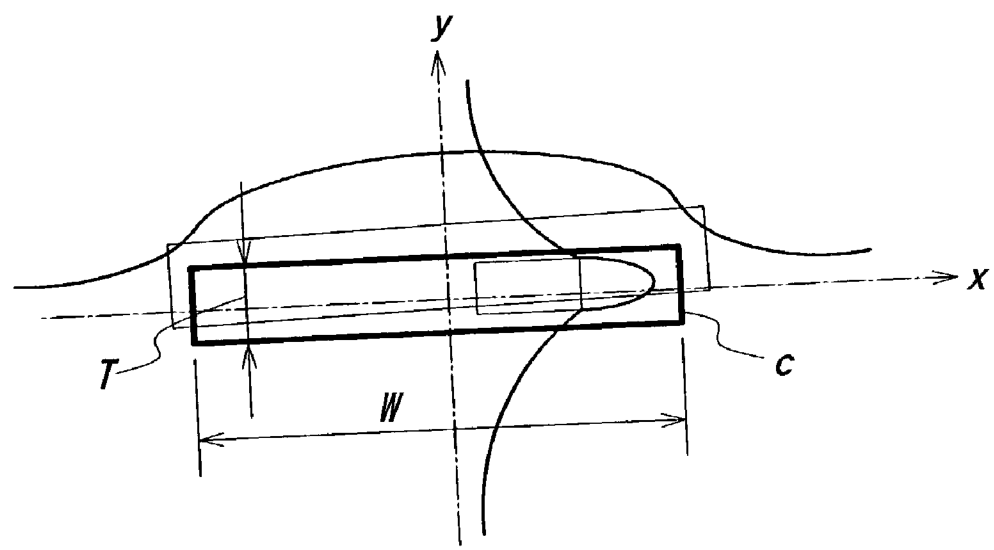
FIG. 10 is a diagram showing the distribution of the light intensity in the branch/cross waveguide of the second embodiment of the optical device according to the present invention.

FIG. 10 shows the distribution of the intensity of light waves propagating through a branch/cross waveguide in a section of the waveguide. The distribution of the intensity in the lateral direction (x direction) of a core layer c is nearly in the shape of a Gaussian distribution.

On the other hand, the distribution of the intensity in the vertical direction (y direction) of the core layer c takes the shape of an exponential distribution different from the ordinary waveguide. This is caused by a fact that the spot size of the light waves in the vertical direction is substantially larger than the thickness T of the core layer c due to a small optical confinement effect in the waveguide in the vertical direction.

In case of the waveguide with a normal optical confinement effect or the waveguide with a comparatively intense optical confinement effect like a conventional branch/cross waveguide, the distribution of the intensity of light waves takes a shape close to a Gaussian distribution in both the vertical direction and the lateral direction. As a result, in comparison with the crosstalk characteristic of the branch/cross waveguide through which light waves with a Gaussian distribution propagate(FIG. 4), this embodiment has a characteristic different from that shown in FIG. 4.

Figure 11:
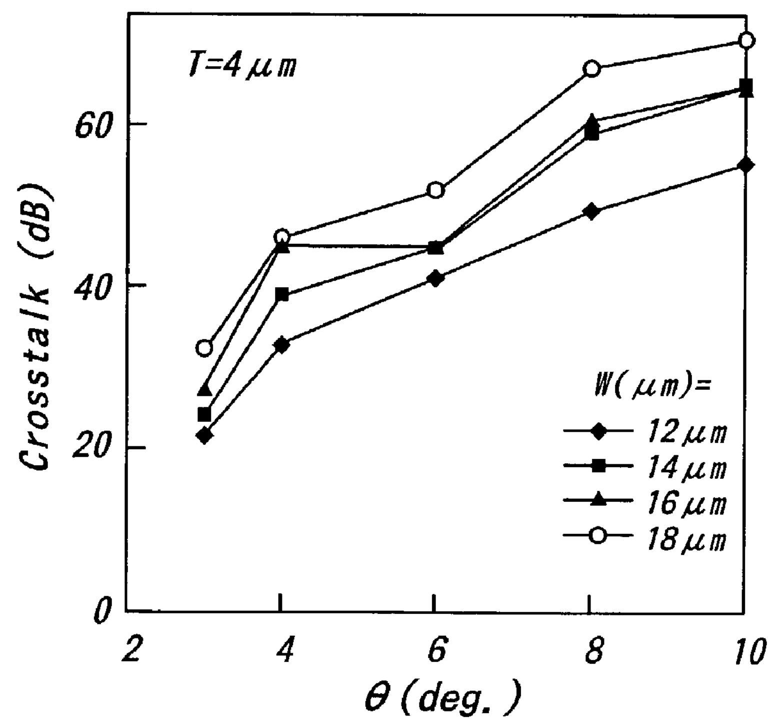
FIG. 11 is a diagram showing the relation between the branch angle θ and the crosstalk in the cross waveguide when the thickness of the core layer is 4μm.
Figure 12:
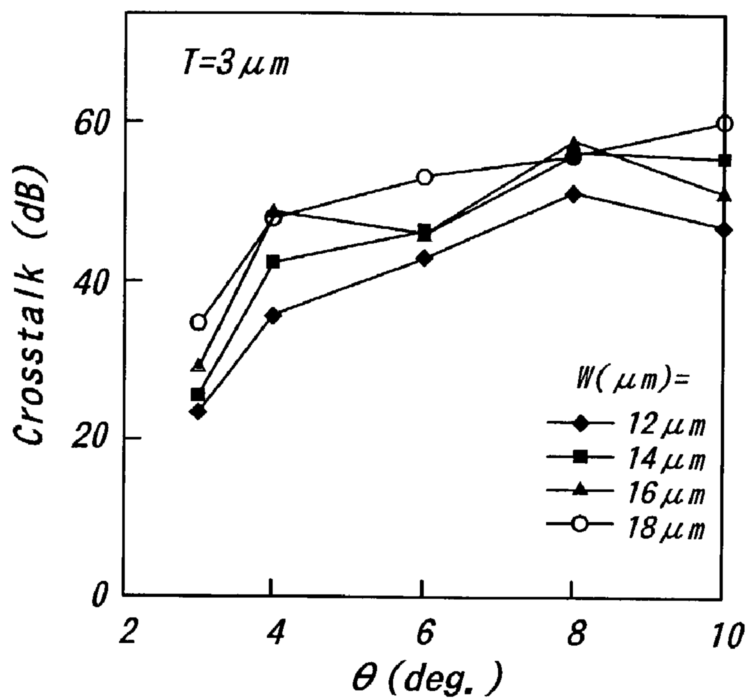
FIG. 12 is a diagram showing the relation between the branch angle θ and the crosstalk in the cross waveguide when the thickness of the core layer is 3μm.
Figure 13:
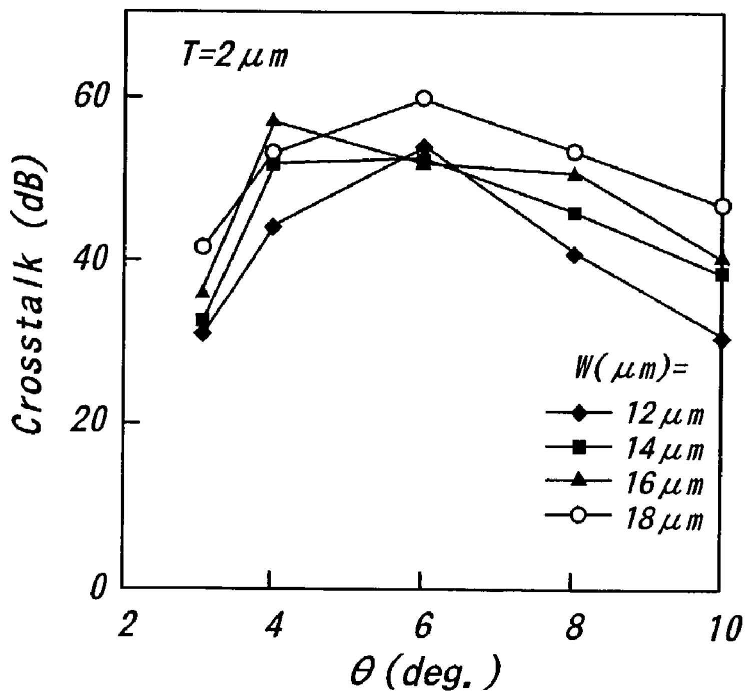
FIG. 13 is a diagram showing the relation between the branch angle θ and the crosstalk in the cross waveguide when the thickness of the core layer is 2μm.

FIGS. 11 to 13 show the relation between the crosstalk and the branch/cross angle θ in case of setting the thickness of the core layer c at 4 μm, 3 μm and 2 μm when the refractive index difference between the core layer and the clad layer is 0.2% in the present invention, respectively.

FIG. 11 shows a characteristic in case of forming a waveguide having a comparatively intense optical confinement effect by making the thickness T of a core layer c comparatively large. As shown in FIG. 11, like the characteristic shown in FIG. 4, as large the branch/cross angle θ and the width W of the core layer c are, the greater the crosstalk characteristic. However, FIG. 11 is different from FIG. 4 in that the effect of improvement in the crosstalk is not remarkable even if the branch/cross angle θ is comparatively large.

In case of making the thickness T of the core layer c smaller, as shown in FIG. 13, in a range of 3° to 6° in this embodiment, the larger the branch/cross angle θ is, the greater the crosstalk is. However, when the branch/cross angle θ is larger than 6°, the crosstalk characteristic tends to be worse.

In this case, as the optical confinement effect in the vertical direction is comparatively small, the light waves propagating through the core layer c have the distribution of the intensity in the shape of the exponential distribution as shown in FIG. 10. Such light waves in the shape of the exponential distribution have a substantially small spot size in the central part (core part) of the optical waveguide, namely, they have properties obtained by superposing the light waves being effectively intense in the optical confinement on light waves being comparatively larger in the spot size in the periphery (clad part) of the optical waveguide.

Because of this, a component with an effectively large spot size in the branch/cross waveguide propagates as spreading in a comparatively wide angle in the direction of the propagation of the light waves due to an effect of diffraction. In case of setting the cross/branch angle θ at the substantially same degree as such a spreading angle, the diffracted light tends to couple to the branch/cross waveguide and comes to make the crosstalk worse.

In this embodiment, therefore, there is the optimum cross/branch angle θ with a good crosstalk in a range of comparatively small angles. The optimum cross/branch angle θ depends on the material, the refractive index difference and the structure of the optical waveguide. When the cross/branch angle θ is larger than 8°, the crosstalk characteristic tends to be improved as the cross/branch angle θ increases similar to the construction of the optical waveguide throught which the light waves in the shape of a normal Gaussian distribution propagate.

FIGS. 8 and 9 have respectively shown the cases that the refractive index difference between the core layer and the clad layer is 0.5% and 0.3%, respectively, however, in case that the refractive index of the core layer is different from that of the clad layer, an effect of the present invention can be obtained by properly setting the width and the thickness of the core layer according to the refractive index difference between these layers.

Figure 14A:
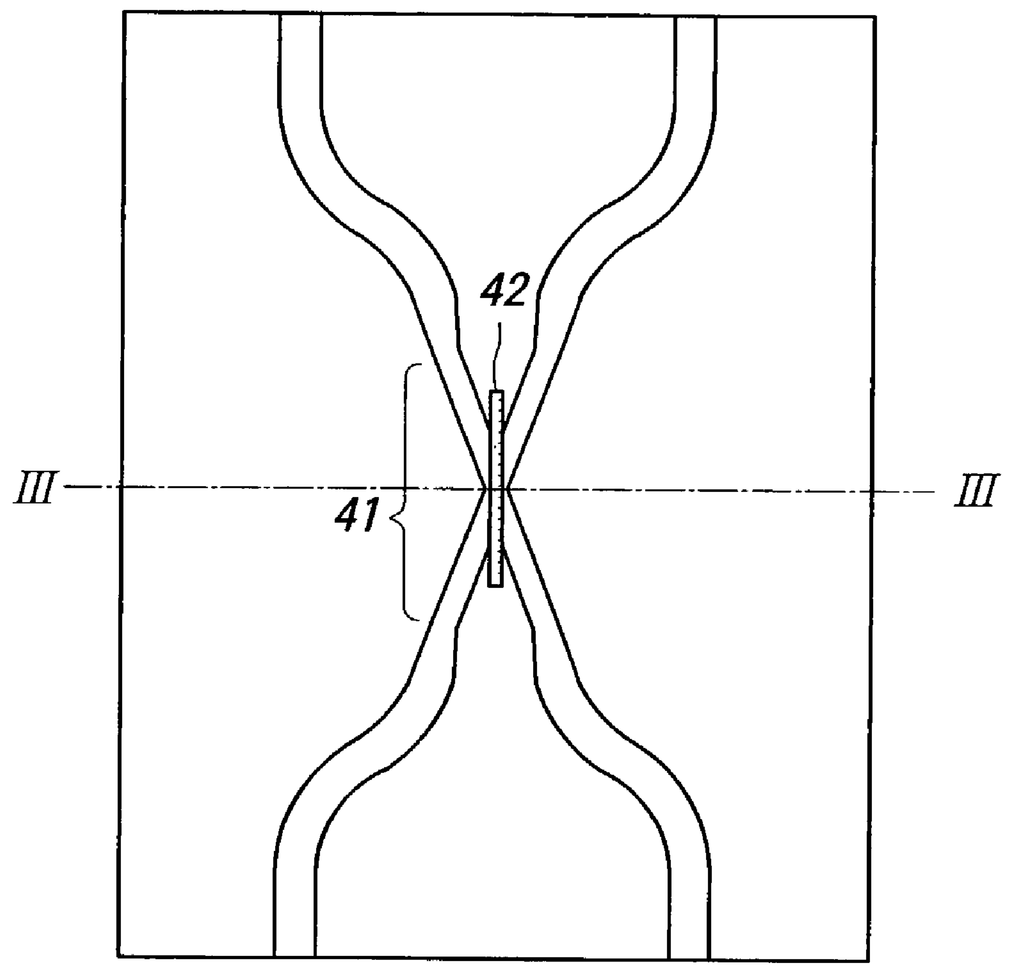
FIG. 14 is a diagram showing a third embodiment of the optical device according to the present invention.
Figure 14B:
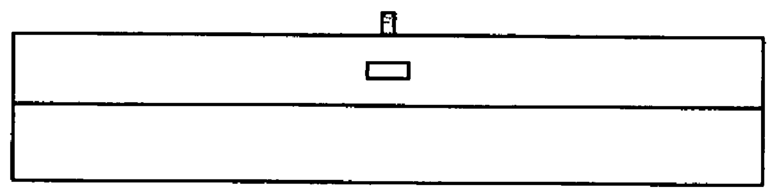

FIG. 14A is a top view of a third embodiment of the optical device according to the present invention, and FIG. 14B shows a section III—III of FIG. 14A. This embodiment takes a 2×2 switch form by arranging an electrode 42 just above the cross part of a cross waveguide 41. The present invention can be also applied to such an optical switch of the 2×2 switch form.

Figure 15:
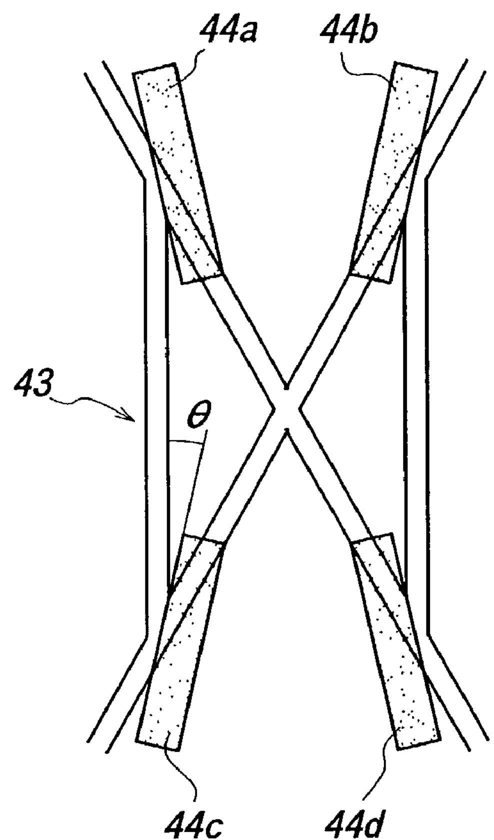
FIG. 15 is a diagram showing a fourth embodiment of the optical device according to the present invention.

FIG. 15 is a diagram showing a fourth embodiment of the optical device according to the present invention. This has a 2×2 switch form with a cross waveguide 51 and four electrodes *44a*, *44b*, *44c* and *44d*, and the present invention can be also applied to this.

Figure 16:
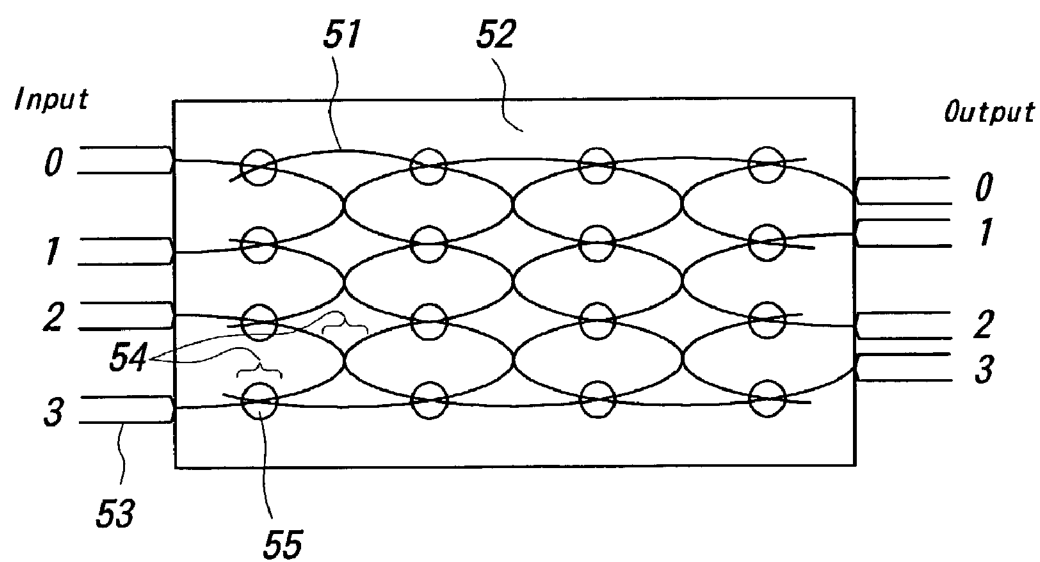
FIG. 16 is a diagram showing a fifth embodiment of the optical device according to the present invention.

FIG. 16 is a diagram showing a fifth embodiment of the optical device according to the present invention. This forms a matrix switch, and comprises core layers 51 with optical waveguides, a clad layer 52, optical fibers 53 connected to the input side and output side, cross waveguides 54 and optical switch elements 55.

A cross waveguide structure of the above-mentioned optical switch portion may be used as the cross waveguide 54, and any of the first type of the switch and the second type of the switch may be used as the optical switch element 55. In this case it is possible to realize an optical switch matrix to which the present invention is applied.

Although the case where the single-mode optical waveguide is used as the optical waveguide has been described hereinbefore, when using the waveguide with a small length or that formed with a high accuracy waveguide processing technique, it is possible to apply the present invention because a low mode conversion loss can be achieved even if the multi-mode optical waveguide is used as a part of the optical device. Furthermore, the present invention can be applied to the case of using the multi-mode optical waveguide as the whole optical waveguides.

The above-mentioned embodiments can be applied to all optical devices such as a semiconductor optical waveguide device utilizing a plasma effect caused by carriers in a semiconductor, a multiple quantum well structure effect and the like, and a ferroelectric optical waveguide device composed of lithium niobate or the like utilizing an EO effect, and they are each formed of an optical device composed of glass, polymer and the like utilizing a TO effect as the most suitable ones.

Figure 17:
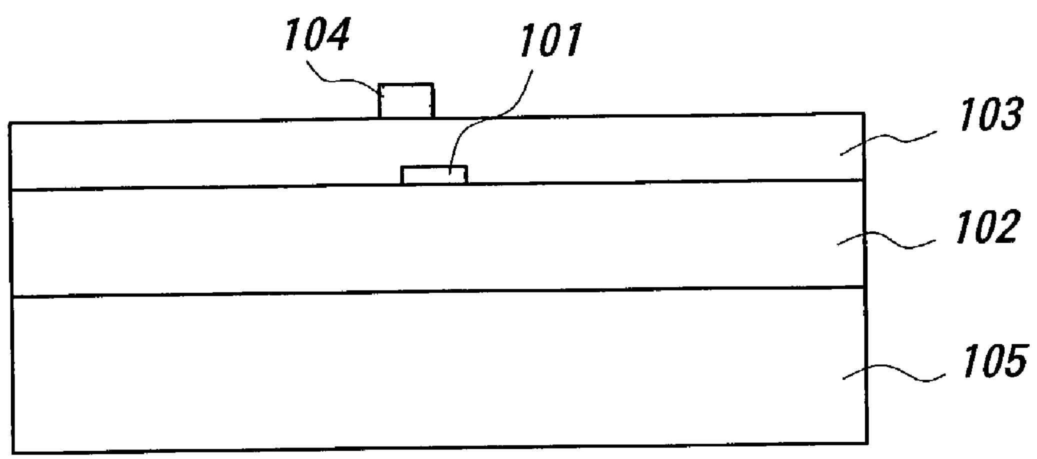
FIG. 17 is a diagram showing a sixth embodiment of the optical device according to the present invention.

FIG. 17 is a diagram showing a sixth embodiment of the optical device according to the present invention. This shows a section of the central part of a cross waveguide, and comprises a core layer 101 of the refractive index n having an optical waveguide, a first clad layer 102 of refractive index ns I and the thickness ts1, a second clad layer 103 of the refractive index ns2 and the thickness ts2, an electrode 104 for changing the refractive index of the cross waveguide by applying a certain voltage or supplying a certain current, and a substrate 105.

In this embodiment, the core layer 101, the clad layer 102 and the clad layer 103 are each formed of a polymer material such as polyimide with a negative temperature coefficient, and the relation among the refractive indexes is:

$$nc>ns2>ns1.$$

Figure 18:
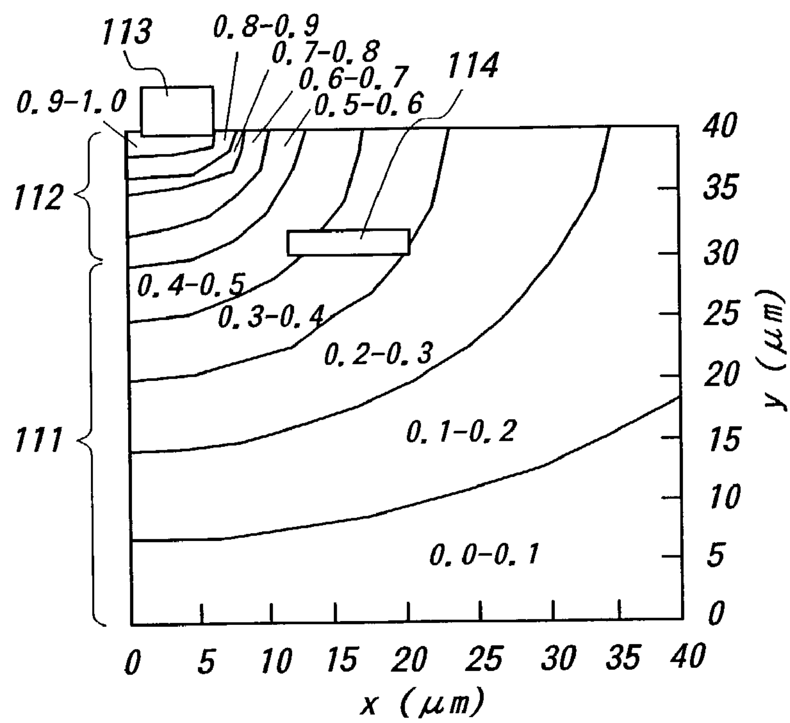
FIG. 18 is a diagram showing the distribution of the temperature of the optical device of the prior art.
Figure 19:
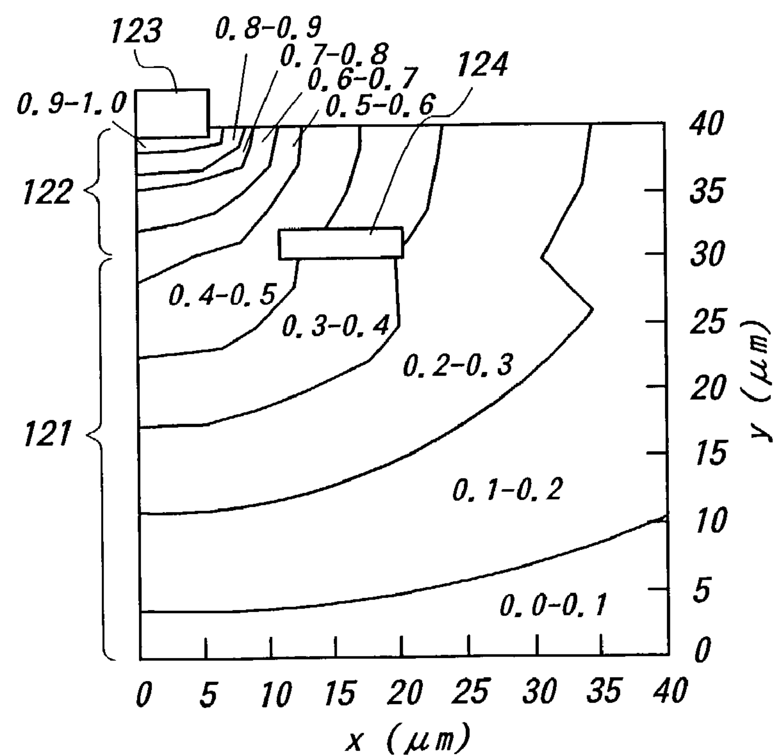
FIG. 19 is a diagram showing the distribution of the temperature of the optical device of 0.05% in refractive index difference according to the present invention.
Figure 20:
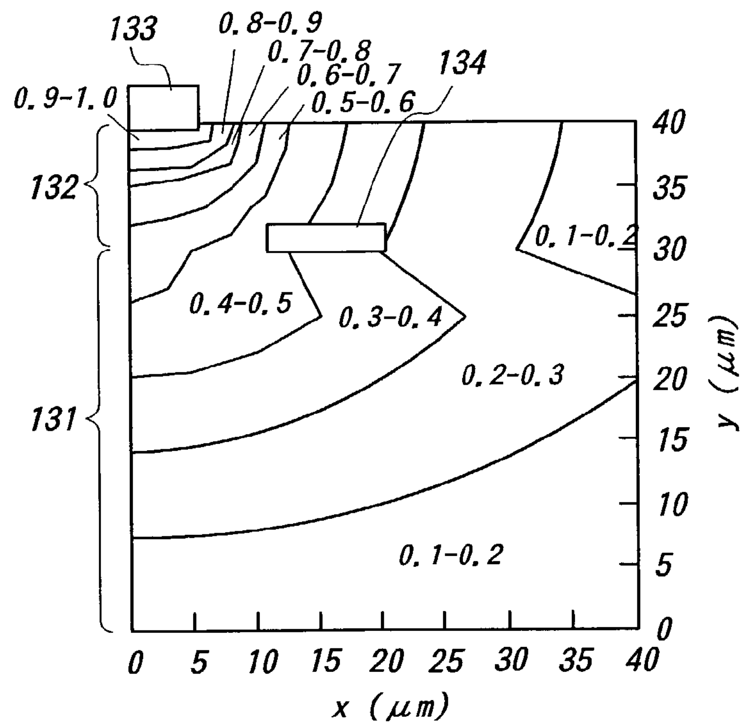
FIG. 20 is a diagram showing the distribution of the temperature of the optical device of 0.10% in refractive index difference according to the present invention.
Figure 21:
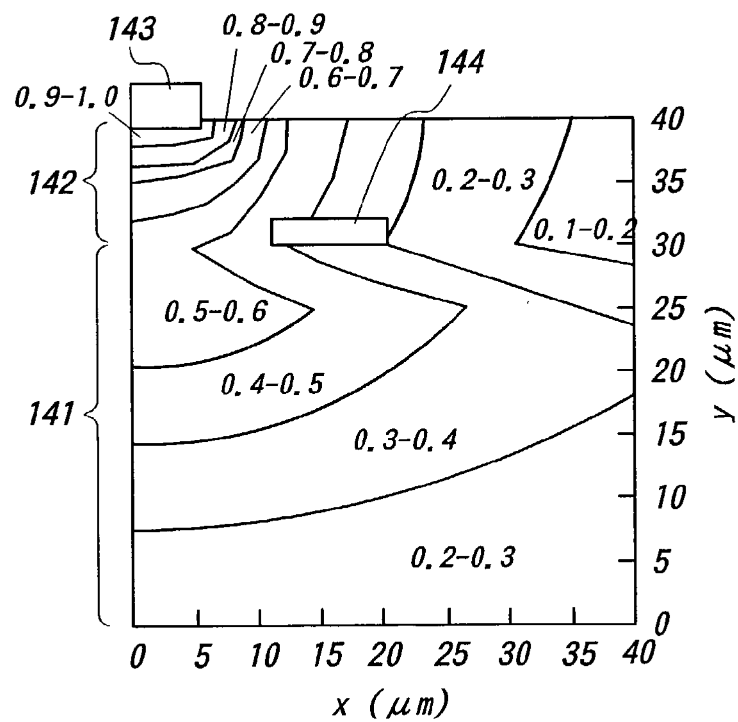
FIG. 21 is a diagram showing the distribution of the temperature of the optical device of 0.20% in refractive index difference according to the present invention.

FIG. 18 is a diagram showing an effective temperature distribution at a vicinity of a cross waveguide of the conventional optical device in which the first clad layer has the same refractive index as that of the second clad layer, and FIGS. 19 to 21 are diagrams each showing an effective temperature distribution at a vicinity of a cross waveguide of an optical device according to the present invention in which the refractive index of the first clad layer is different from that of the second clad layer. These temperature distributions represent values calculated by the finite element method, and the numerical ranges in the figures represent respectively values normalized by the temperature of the electrodes 113, 123, 133 and 143 taking the temperature of a substrate not shown in figures as a reference value. The thicknesses of the first clad layers 111, 121, 131 and 141 are respectively 30 μm, and the thicknesses of the second clad layers 112, 122, 132 and 142 are respectively 10 μm. The first clad layers 111, 121, 131 and 141, the second clad layers 112, 122, 132 and 142, and the core layers 114, 124, 134 and 144 are each composed of the polyimide material.

The polyimide material has a TO effect in which the refractive index decreases as the temperature increases. Therefore, these temperature distributions correspond to the spatial distributions of the refractive index change portions based on the TO effect, and shows that the refractive index decreases as the temperature increases.

As seen from FIG. 18, an isothermal line of the distribution of temperature comes into a state closer to the perpendicularity to the x-axis and the temperature increases as being closer to the electrode 113. However, if the cross waveguide, namely, the core part 114 is close to the electrode 113, the absorption loss of the light is caused by the electrode 113. Reducing such an influence and considering the perpendicularity of a high-temperature and isothermal line to the x-axis and a required switching speed, the position of the core layer 114 as well as the sum of the thickness of the first clad layer 111 and that of the second clad layer 112 are determined.

In this case, it is preferable to set the center of the core layer 114 at a position being about 10 μm in depth from the surface of the second clad layer 112 and about 10 to 20 μm apart in the x-axis direction from an end of the electrode 113. However, there is a disadvantage that a part of the reflection light is radiated due to a fact that an isothermal line of the temperature distribution is inclined to a y-z axis plane, namely, a plane perpendicular to the x-axis at a vicinity of the core layer 114, and the total reflection surface of light input into the cross waveguide is deviated from the plane perpendicular to the x-axis.

In FIGS. 19 to 21, the first clad layers 121, 131 and 141 have a lower refractive index than that of the second clad layers 122, 132 and 142. In FIG. 19, the difference in the refractive index between the first clad layers 121, 131 and 141 and the second clad layers 122, 132 and 142 is 0.05%, in FIG. 20, the refractive index difference is 0.1%, and in FIG. 21, the refractive index difference is 0.2%.

In FIGS. 19 to 21, also, an actual temperature distribution in the first clad layers 121, 131 and 141 and the second clad layers 122, 132 and 142 is similar to FIG. 15, however, when considering that the polyimide has the TO effect with the negative temperature coefficient of about $-1\times10^{-4/\circ}$ C., the whole first clad layers 121, 131 and 141 result in being raised in temperature by 1° C. per the refractive index difference of 0.01% between the first clad layers 121, 131 and 141 and the second clad layers 122, 132 and 142.

For example, when the electrodes 123, 133 and 143 are raised by 100° C. in temperature, the first clad layers 121, 131 and 141 are larger by 0.01 in terms of normalized temperature per refractive index difference of 0.01%. It is FIGS. 16 to 18 that shows the result of calculation of an effective temperature distribution obtained by considering such an effect. That is to say, when the refractive index difference is set at about 0.05% to 0.1%, the temperature distribution (isothermal line) at a vicinity of the core layer is substantially perpendicular to the x-axis.

With the utilization of this principle, the loss and the crosstalk caused by the total reflection of the light can be reduced by considering the influence of the TO effect or the EO effect of the waveguide material and the position of a core layer, and properly setting the thickness and the refractive index difference of the clad layer. In case of using, for example, a polymer material as a waveguide material, magnitude of the refractive index can be set by a proper combination of ingredients and the like, the thickness can be set by adjusting the viscosity of an unhardened polymer material or the rotation speed of a spinner, and these waveguide structures can be realized by using a conventional photolithographic technique or film forming technique.

Figure 22:
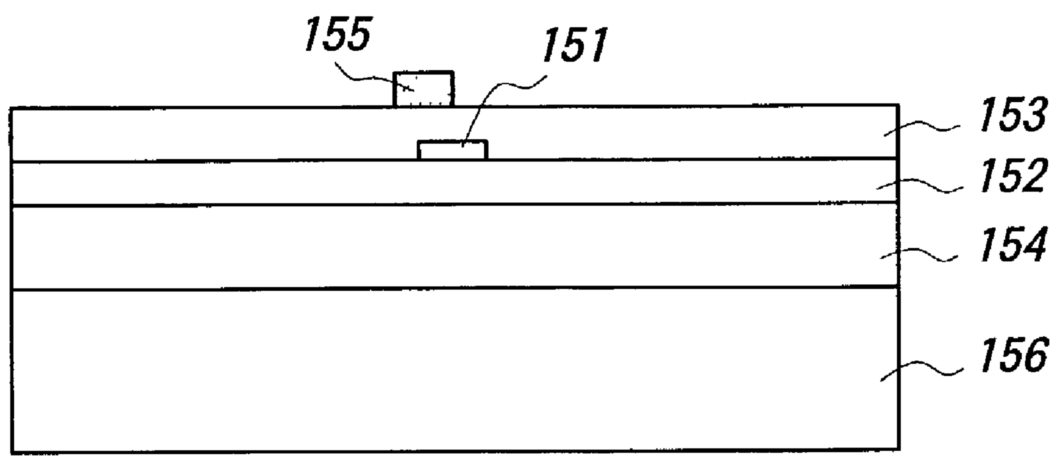
FIG. 22 is a diagram showing a seventh embodiment of the optical device according to the present invention.

FIG. 22 is a diagram showing a seventh embodiment of the optical device according to the present invention. This shows a section of the central part of a cross waveguide, and comprises a core layer 151 of the refractive index nc having the optical waveguide, a first clad layer 152 of the refractive index ns11 and the thickness ts11, a second clad layer 153 of the refractive index ns1 and the thickness ts12, a third clad layer 154 of the refractive index ns13 and the thickness ts13, an electrode 155 for changing the refractive index of the cross waveguide by applying a certain voltage or supplying a certain current, and a substrate 156.

In this embodiment, the core layer 151, the clad layer 152, the clad layer 153 and the clad layer 154 are each composed of the polymer material such as the polyimide with the negative temperature coefficient, and the relation among the refractive indexes is:

$$nc>ns12>ns11>ns13.$$

The present invention can be also applied to a case of further comprising the third clad layer 154 in this way. Two or more clad layers may be interposed between the second clad layer and the substrate.

Figure 23A:
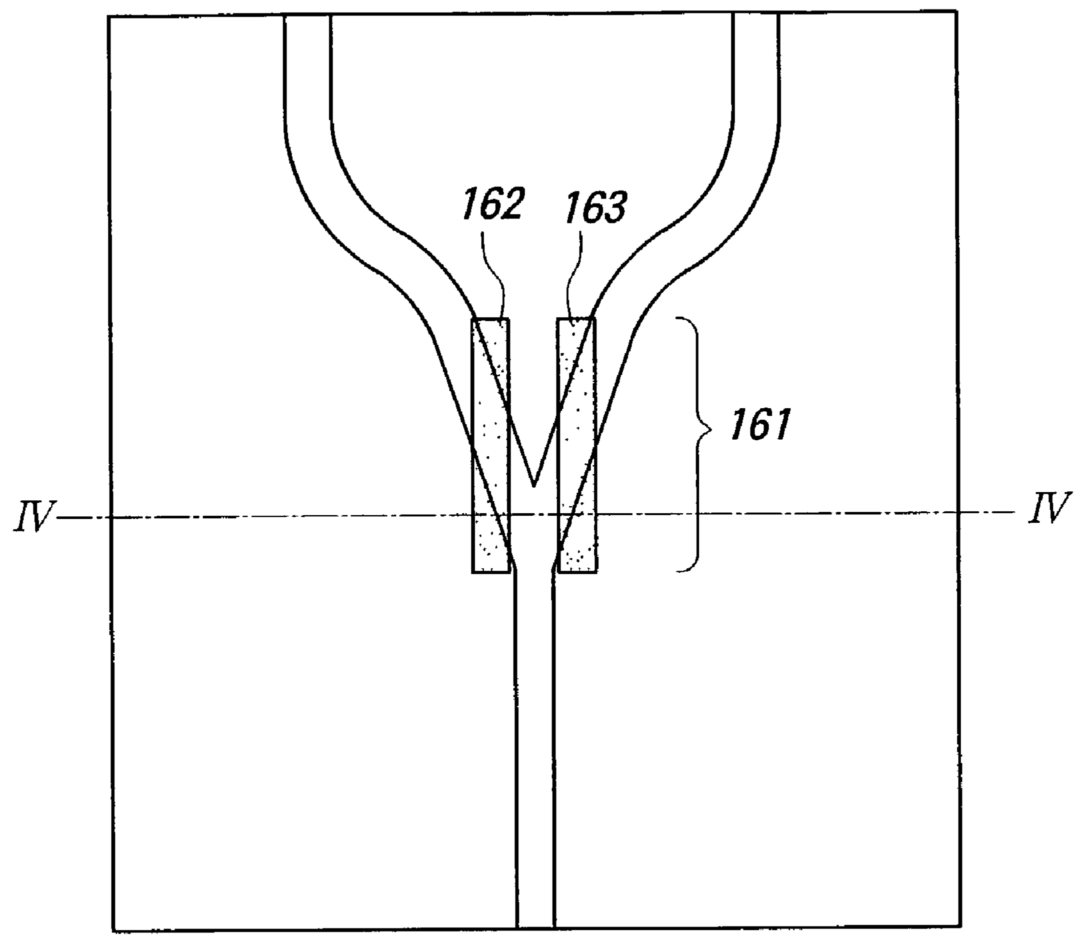
FIGS. 23A and 23B are diagrams showing an eighth embodiment of the optical device according to the present invention.
Figure 23B:
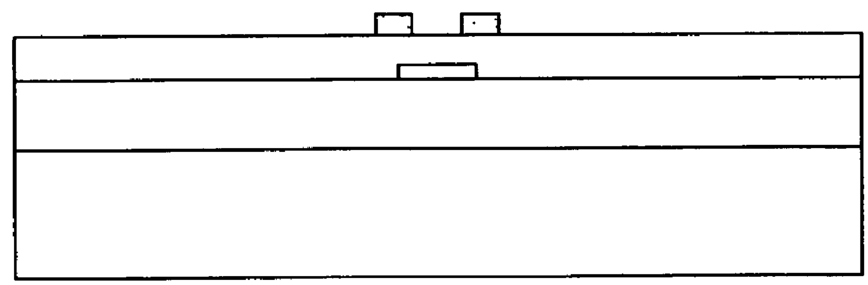

FIG. 23A is a top view of an eighth embodiment of the optical device according to the present invention, and FIG. 23B shows a section IV—IV of FIG. 23A. In this embodiment, two electrodes 162 and 163 are arranged above a branch waveguide 161. The present invention can be also applied to this case.

Although a case of using the polyimide material with the negative temperature coefficient has been described hereinbefore in order to obtain the TO effect, it is possible also to form the core layer and the clad layer using a material with a positive temperature coefficient. In case of using $LiNbO_3$, PLZT, optical glass and the like as such a material, in the fifth embodiment, the refractive indexes need to have the following relation:

$$ns2<ns1>\text{and}$$

in the seventh embodiment, the refractive indexes need to have the following relation:

$$ns12<ns11<ns13.$$

In case of utilizing the EO effect, it is enough to utilizing a current injection effect (plasma effect) of a semiconductor to the distribution of the intensity of the electric field formed by an applied voltage between the electrode and the substrate and set the refractive index and the thickness of the clad layer, and the principle of the present invention can be also applied to any optical material.

Next, the relation between the thickness and the coupling loss of the first clad layer (for example, a clad layer 102 in FIG. 7) is described with reference to FIGS. 24 and 25.

Figure 24:
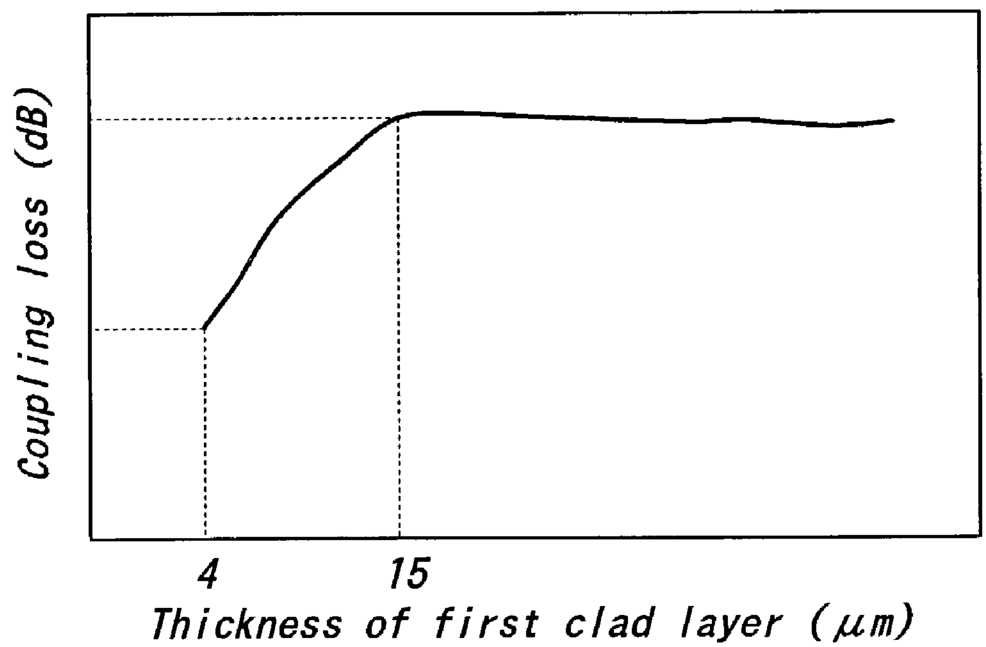
FIG. 24 is a diagram showing the relation between the thickness of the first clad layer and the coupling loss.
Figure 25:
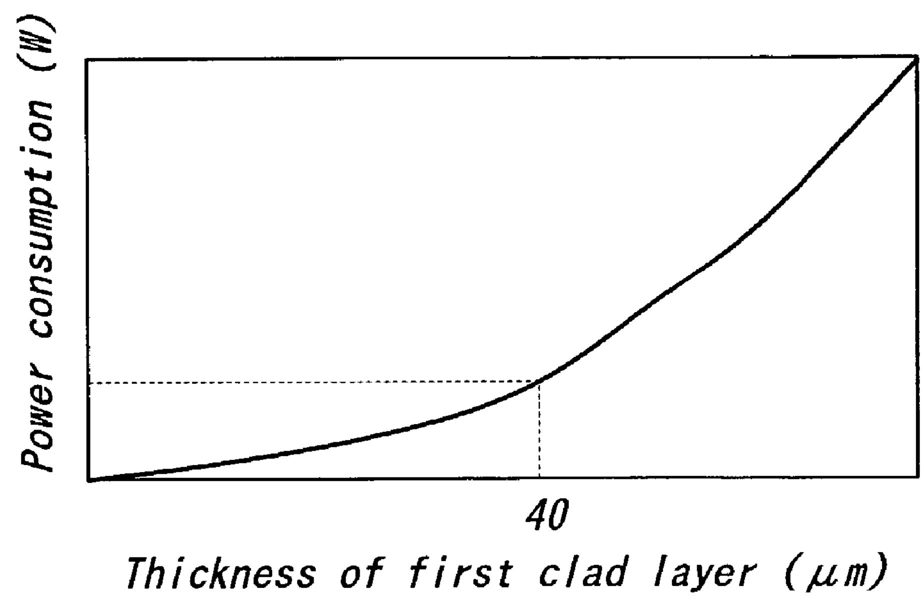
FIG. 25 is a diagram showing the relation between the thickness of the first clad layer and the power consumption.

As shown in FIG. 24, if the thickness of the first clad layer is smaller than 15 μm, the coupling loss decreases. When the thickness of the first clad layer is smaller than 4 μm, however, the light may leak from the first clad layer, and thus the propagation loss may degrade. As a result, it is preferable to have the thickness of the first clad layer not less than 4 μm.

On the other hand, when the thickness of the first clad layer is not less than 15 μm, the coupling loss is substantially saturated and a substantial reduction of the coupling loss is not achieved. And as shown in FIG. 25, when the thickness of the first clad layer exceeds 40 μm, the rate of the increase of the power supply is remarkable. As a result, the thickness of the first clad layer is preferably not more than 40 μm, and more preferably, it is not more than 15 μm.

Next, in case of the 2×2 optical device (a 2-input and 2-output type of an optical switch), the ratio of the width of the electrode to that of the optical waveguide in a preferable embodiment of the present invention is described with reference to FIGS. 26 to 28 in comparison with a conventional optical device.

Figure 26:
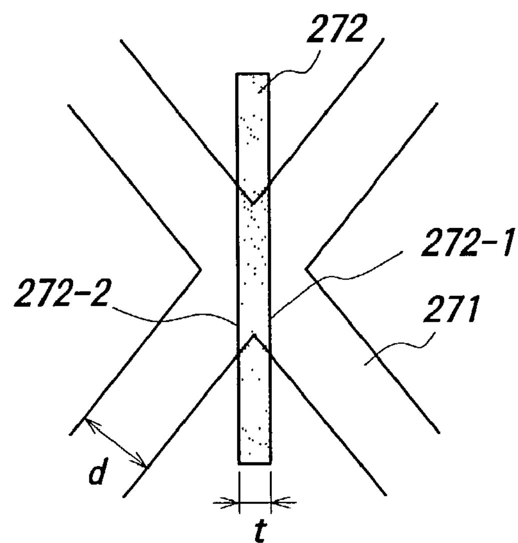
FIG. 26 is a diagram for explaining the relation between the width of the electrode and that of the optical waveguide in the optical device of the prior art.

As a conventional 2×2 optical device uses a waveguide whose core layer has a comparatively large sectional area and which has a remarkably intense optical confinement effect, it is necessary to have a comparatively narrow width t of an electrode 272 arranged in the central part near the branch waveguide, namely, the ratio (t/d) of the width t of the electrode 272 to the width d of the waveguide in FIG. 26 in order to have the excessive loss as small as possible. In case that the width t is small, however, it is difficult to align the electrode 272 with the branch waveguide 271, and making an electric current flow through the electrode 272 is liable to cause the breaking of wire.

Figure 27:
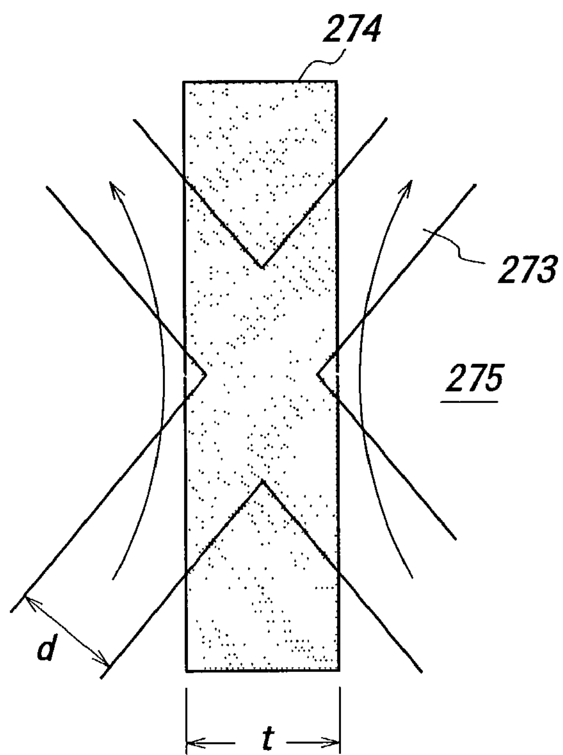
FIG. 27 is a diagram for explaining the relation between the width of the electrode and that of the optical waveguide in the optical device according to the present invention.

According to the preferred embodiment of the present invention, by using the single-mode optical waveguide having a comparatively small sectional area of the core layer and with the optical confinement not being substantially intense, the width t of the electrode 274 arranged near the branch waveguide 273 shown in FIG. 27, namely, the ratio (t/d) of the width t to the width d of the waveguide is comparatively large, and thus an optical switching is performed in such a manner that the light passes through the first clad layer 275 from the branch optical waveguide 273 and propagates again through the branch waveguide 273 as shown by an arrow.

Figure 28:
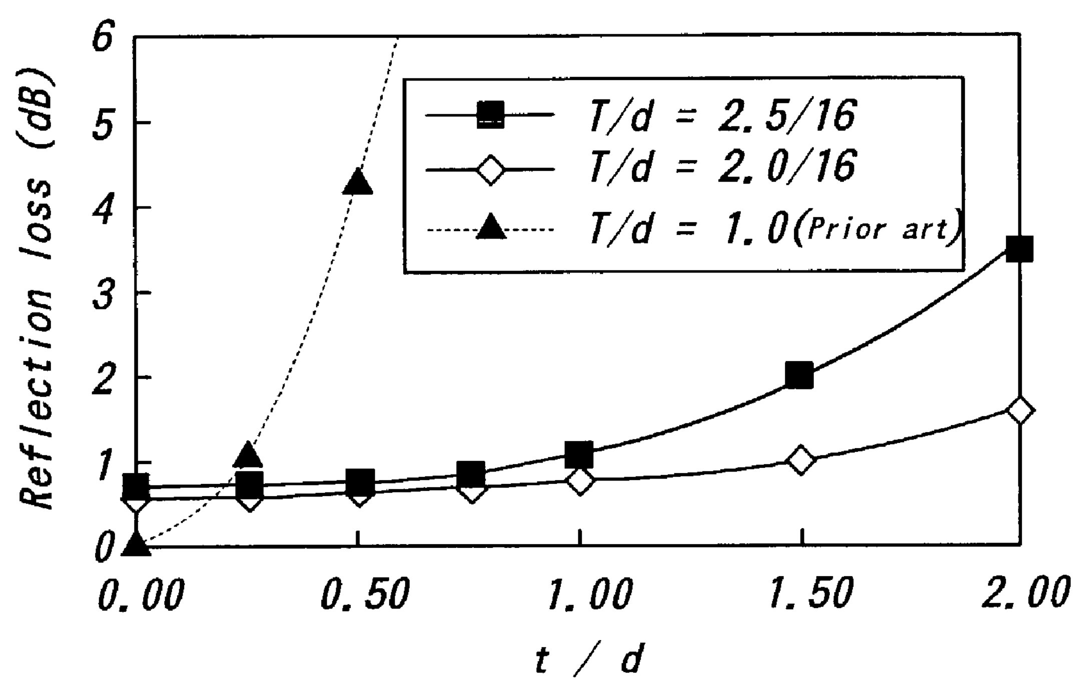
FIG. 28 is a diagram for explaining the relation among the ratio of the width of the electrode to that of the optical waveguide, the temperature of the electrode and the driving power in the optical device according to the present invention.

FIG. 28 shows the relation between the loss in the switching operation (the reflection loss) and a standard value t/d of the electrode width in the 2×2 optical devices of the prior art and the present invention. Here, the shape of a core (T/d, T: core thickness) is taken as a parameter. It is found from FIG. 28 that in the optical device using a conventional optical waveguide with an intense optical confinement, if t/d is very small, the loss is small, however, the loss increases remarkably as the t/d increases. In this phenomenon, the electrode end parts 272-1 and 272-2 function as the total reflection surfaces to the wave-guided light in the switching operation, and as t/d increases, the reflected light leaks to the clad and causes a substantial loss.

On the other hand, according to the present invention, when t/d is small, a slight excess loss occurs in the switching operation. This is caused by the loss occurring at the branch/cross part because of using the single-mode waveguide with a weak confinement. However, it is possible to suppress the loss to a slight increase though t/d increases. The reason is that in the present invention as the third clad layer 154 having a relatively small refractive index as shown in FIG. 22 is arranged, the reflected light leaking to the clad region 275 is coupled again into the branch waveguide 273 and the increase of loss is suppressed. Therefore, if t/d is not less than 0.2, the reflection loss can be greatly reduced in comparison with the prior art.

If the width t of the electrode 274 is larger than a value in a certain range, there is a problem that the power consumption of the electrode increases. Also, when the width of a region functioning as the core layer increases and the light reaches the output side of the waveguide, evanescent waves at the region functioning as the core layer leak to the output side of the waveguide and the extinction ratio decreases. Therefore, the optimum range of the width t of the electrode 274 depends on the thickness of the clad layer and the width d of the core layer, and the maximum extinction ratio is obtained by making the width t not more than 3 times the width d of the core layer 271.

While the present invention has been described above with reference to certain preferred embodiments, it should be noted that they were present by way of examples only and various changes and/or modifications may be made without departing from the scope of the invention. For example, the present invention can be also applied to an optical device having a single input waveguide, not less than three output waveguides and a branch waveguide for connecting them, an optical device having not less than three input waveguides, a single output waveguide and a branch waveguide for connecting them, an optical device having not less than two input waveguides, not less than three output waveguides and a cross waveguide for connecting them, or an optical device having not less than three input waveguides, not less than two output waveguides and a cross waveguide for connecting them.

In the above-mentioned embodiments, an optical device provided with an optical switch has been described, however, the present invention can be also applied to an optical device without an optical switch.

Figure 1A:
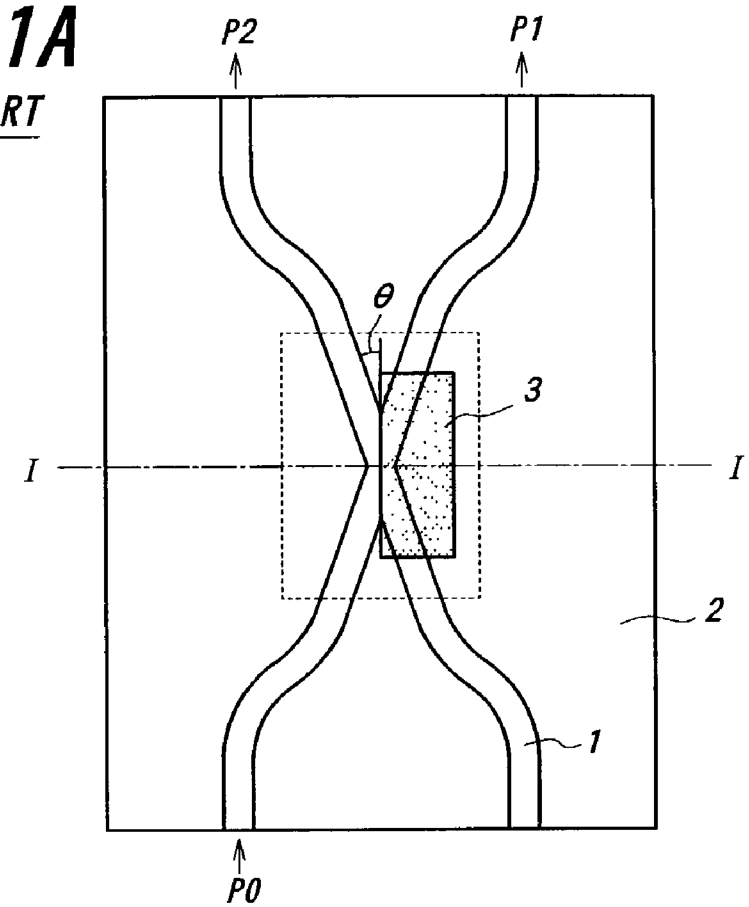
FIGS. 1A–1C are diagrams showing a conventional optical switch.
Figure 1B:
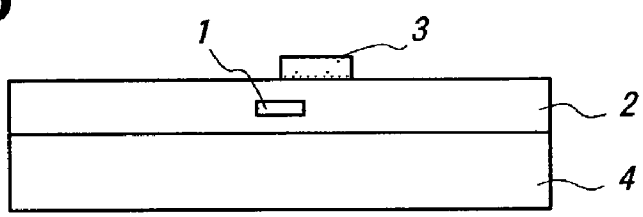
Figure 1C:
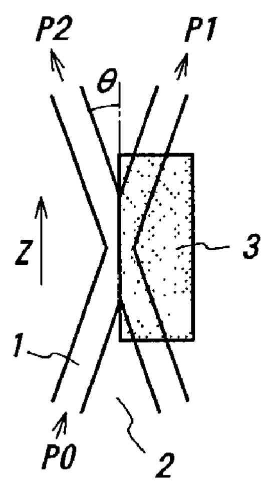

In the first embodiment, the case where the spot size of the light propagating through the branch/cross waveguide is larger than that of the light propagating through the optical input waveguide, the optical output waveguide or the connection waveguide has been described, however, when the spot size of the light propagating through the branch/cross waveguide is not less than 5 μm, it is possible to have a small loss of the optical input waveguide, the optical output waveguide or the connection waveguide and have a small diffraction of the light at the branch/cross waveguide regardless of the spot size of the light propagating through the optical input waveguide, the optical output waveguide or the connection waveguide, and thus it is possible to reduce the optical loss and crosstalk in the optical device. Such an optical device can be formed by coupling light input into the optical input waveguide with a lens or a spot magnifying waveguide and coupling light output from the optical output waveguide with the lens or the spot magnifying waveguide in the optical switch in FIG. 1, for example. In this case, for example, the spot size of each light propagating through the branch/cross waveguide, the optical input waveguide, the optical output waveguide and the connection waveguide is not less than 5 μm.

The invention claimed is:

1. An optical device comprising:

an optical input waveguide;

a branch/cross waveguide including two waveguide portions, the entireties of which are non-parallel to one another;

an optical output waveguide; and connection waveguides for respectively connecting said optical input waveguide and said branch/cross waveguide to one another, and connecting said optical output waveguide and said branch/cross waveguide to one another, wherein the spot size of light propagating through said branch/cross waveguide is larger than the spot size of light propagating through said optical input waveguide, said optical output waveguide, or said connection waveguides, and wherein at least one of the width and the thickness of said branch/cross waveguide is set at a value smaller than the width or the thickness of said optical input waveguide and said optical output waveguide; and wherein a branch/cross angle of said branch/cross waveguide is at least 3 degrees.

2. The optical device according to claim 1, wherein the spot size of light propagating through said branch/cross waveguide is not less than 5 μm, and the spot size of light propagating through said optical input waveguide, said optical output waveguide or said connection waveguides is less than 5 μm.

3. An optical device comprising:

an optical input waveguide;

a branch/cross waveguide including two waveguide portions, the entireties of which are non-parallel to one another;

an optical output waveguide; and connection waveguides for respectively connecting said optical input waveguide and said branch/cross waveguide to one another, and connecting said optical output waveguide and said branch/cross waveguide to one another, wherein the spot size of light propagating through said branch/cross waveguide is not less than 5 μm, and wherein a branch/cross angle of said branch/cross waveguide is at least 3 degrees.

4. The optical device according to claim 1, wherein the ratio of the width to the thickness of said branch/cross waveguide is not less than 10/4.

5. The optical device according to claim 1, wherein the width and the thickness of said branch/cross waveguide are not less than 10 μm and not more than 4 μm, respectively.

6. The optical device according to claim 1, wherein the branch/cross angle of said branch/cross waveguide is no more than 6 degrees.

7. The optical device according to claim 1, wherein said branch/cross waveguide consists of a single-mode waveguide.

8. The optical device according to claim 1, wherein said connection waveguide has a tapered waveguide.

9. The optical device according to claim 1, wherein the spot size of light input into said optical input waveguide is substantially equal to the spot size of light output from an optical element or an optical waveguide to be connected to said optical input waveguide.

10. The optical device according to claim 1, wherein the spot size of light output from said optical output waveguide is substantially equal to the spot size of light input into an optical element or an optical waveguide to be connected to said optical output waveguide.

11. The optical device according to claim 1, further comprising an optical switch for switching over the direction of propagation of light input into said branch/cross waveguide.

12. The optical device according to claim 11, wherein said optical switch has at least one electrode for changing the refractive index of said branch/cross waveguide by applying a certain voltage or supplying a certain current.

13. The optical device according to claim 1, wherein said optical device is an optical switch, and further comprises an electrode positioned above at least a portion of said branch/cross waveguide.

14. The optical device according to claim 3, wherein said optical device is an optical switch, and further comprises an electrode positioned above at least a portion of said branch/cross waveguide.

* * * * *